(12) United States Patent
Choudhari et al.

(10) Patent No.: US 10,754,774 B2
(45) Date of Patent: Aug. 25, 2020

(54) BUFFER MANAGER

(71) Applicant: AVAGO TECHNOLOGIES INTERNATIONAL SALES PTE. LIMITED, Singapore (SG)

(72) Inventors: Niren Madanlal Choudhari, Milpitas, CA (US); Samir Bhattacharya, Pleasanton, CA (US); Changbai He, San Jose, CA (US); Anthony Hou-Kee Ho, Fremont, CA (US); Venkata Suresh Pala, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 50 days.

(21) Appl. No.: 15/941,660

(22) Filed: Mar. 30, 2018

(65) Prior Publication Data
US 2018/0225204 A1  Aug. 9, 2018

Related U.S. Application Data

(63) Continuation of application No. PCT/US2017/030244, filed on Apr. 28, 2017.

(30) Foreign Application Priority Data

May 31, 2016  (IN) .............................. 201641018588

(51) Int. Cl.
*G06F 12/0806* (2016.01)
*G06F 9/455* (2018.01)
*G06F 13/28* (2006.01)

(52) U.S. Cl.
CPC ...... *G06F 12/0806* (2013.01); *G06F 9/45545* (2013.01); *G06F 9/45558* (2013.01);
(Continued)

(58) Field of Classification Search
None
See application file for complete search history.

(56) References Cited

U.S. PATENT DOCUMENTS 6,904,507 B2  6/2005  Gil
7,032,088 B2  4/2006  Paladini et al.
(Continued)

FOREIGN PATENT DOCUMENTS

WO  2017209876  12/2017

OTHER PUBLICATIONS

PCT/US2017/030244, "International Search Report and Written Opinion", dated Aug. 13, 2017, 10 pages.
(Continued)

*Primary Examiner* — Henry Tsai
*Assistant Examiner* — Christopher A Bartels
(74) *Attorney, Agent, or Firm* — Xsensus LLP

(57) ABSTRACT

Systems, methods, apparatus and computer-readable medium are described for improving efficiency and robustness for sharing data across different users, agents, processes, drivers, and applications in a system. A shared buffer between multiple entities may be used for sharing data such that the data is only stored once and accessed by multiple entities without copying the data over and over again. An example system may be a network device. For a received packet at a network interface of a network device, the packet may be stored directly in memory. The application or process responsible for accessing and/or manipulating the packet can directly do so by simply using a buffer pointer provided by the buffer manager.

20 Claims, 16 Drawing Sheets

(52) U.S. Cl.
CPC .... *G06F 13/28* (2013.01); *G06F 2009/45595* (2013.01); *G06F 2212/1016* (2013.01)

(56) References Cited

U.S. PATENT DOCUMENTS

| | | | |
|---|---|---|---|
| 7,496,699 B2 | 2/2009 | Pope et al. | |
| 8,286,188 B1 | 10/2012 | Brief | |
| 8,312,182 B2 | 11/2012 | Toyohara et al. | |
| 8,312,468 B2 | 11/2012 | Warton et al. | |
| 8,752,063 B2 | 6/2014 | Ertugay et al. | |
| 8,886,891 B2 | 11/2014 | Dyke et al. | |
| 8,938,571 B1 | 1/2015 | Vincent | |
| 9,043,812 B2 | 5/2015 | Janssen et al. | |
| 9,208,071 B2 | 12/2015 | Talagala et al. | |
| 9,258,256 B2 | 2/2016 | Lamb | |
| 9,424,027 B2 | 8/2016 | Moore | |
| 2004/0049600 A1* | 3/2004 | Boyd | G06F 12/145 709/250 |
| 2005/0144422 A1* | 6/2005 | McAlpine | G06F 12/1081 711/206 |
| 2006/0036823 A1* | 2/2006 | Mathews | G06F 12/1466 711/164 |
| 2006/0045099 A1* | 3/2006 | Chang | H04L 69/16 370/400 |
| 2006/0195626 A1* | 8/2006 | Arndt | G06F 12/0653 710/10 |
| 2006/0218556 A1* | 9/2006 | Nemirovsky | G06F 9/3851 718/104 |
| 2007/0162701 A1* | 7/2007 | Schlansker | G06F 12/0831 711/118 |
| 2007/0180509 A1* | 8/2007 | Swartz | G06F 9/4406 726/9 |
| 2008/0115117 A1* | 5/2008 | Wilkinson | G06F 21/53 717/139 |
| 2008/0140993 A1* | 6/2008 | Bhargava | G06F 11/3419 712/205 |
| 2010/0217868 A1 | 8/2010 | Heller, Jr. | |
| 2011/0099233 A1 | 4/2011 | Calder et al. | |
| 2011/0153893 A1* | 6/2011 | Foong | G06F 9/4812 710/268 |
| 2011/0153910 A1* | 6/2011 | MacKenna | G06F 13/4234 711/103 |
| 2011/0296164 A1 | 12/2011 | Boebert et al. | |
| 2012/0324147 A1* | 12/2012 | Lai | G06F 13/4291 711/103 |
| 2013/0031390 A1* | 1/2013 | Smith, III | G06F 1/206 713/320 |
| 2013/0162661 A1 | 6/2013 | Bolz et al. | |
| 2013/0194286 A1 | 8/2013 | Bourd et al. | |
| 2013/0198474 A1* | 8/2013 | Shaath | G06F 12/1466 711/163 |
| 2013/0325998 A1* | 12/2013 | Hormuth | G06F 15/17331 709/212 |
| 2014/0123145 A1 | 5/2014 | Barrow-Williams et al. | |
| 2014/0269881 A1* | 9/2014 | He | H04L 25/03878 375/231 |
| 2014/0281641 A1* | 9/2014 | Herrera Mejia | G06F 1/24 713/330 |
| 2014/0281753 A1* | 9/2014 | Wagh | G06F 13/4295 714/56 |
| 2015/0089259 A1* | 3/2015 | Warren | G06F 1/325 713/322 |
| 2015/0242234 A1 | 8/2015 | Harris et al. | |
| 2015/0286472 A1 | 10/2015 | Lim et al. | |
| 2016/0006580 A1 | 1/2016 | Lamb | |
| 2016/0006665 A1 | 1/2016 | Lamb | |
| 2016/0019079 A1* | 1/2016 | Chawla | G06F 9/45558 710/308 |
| 2016/0048453 A1 | 2/2016 | Koehler | |
| 2016/0092678 A1 | 3/2016 | Probert et al. | |
| 2016/0127252 A1 | 5/2016 | Tsirkin et al. | |
| 2017/0185316 A1* | 6/2017 | Nieuwejaar | G06F 3/0611 |
| 2017/0220404 A1* | 8/2017 | Polar Seminario | G06F 8/654 |

OTHER PUBLICATIONS

Dinal Zeliger "Corey: An Operating System for Many Cores" Dec. 13, 2013, 9 pages.
Texas Instruments "TransportNetLib UsersGuide" Last Modified Apr. 28, 2015, 20 pages.
Arcot Rajasekar "Accessing Sensor Data Using Meta data: A Virtual Object Ring Buffer Framework" Aug. 30, 2005, 8 pages.

* cited by examiner

```
Struct pbuf{
    Struct pbuf* next;
    Char* buffer; /*buffer start*/
    Void* payload; /* data start*/
    Unsigned int valid; /* Mark ALLOC/FREE */
    Buffermgr_lock_t lock;
    Long len;
    Short pool_id;
    Unsigned long timestamp;
    /* user call stack*/
    Unsigned long user_stackdump
        [BUFFER_USER_STACKSZ]
    Buffermgr_flag_t flags; /* buff config flags */
    Unsigned int userid;
    Unsigned int appid;
    Char user_name [BUFFMGR_MAX_NAME_LEN];
    Char app_name[BUFFMGR_MAX_NAME_LEN];
}
```

FIG. 6

```
typedef struct {
    buffmgr_lock_t buf_usage_lock;
    unsigned int total_alloc;
    unsigned int total_free;
    unsigned int total_inuse;
    /* To capture user peak buff usage
    (watermark) */
    unsigned int user_buf_peak_use;
    unsigned char is_user_present;
    char
    user_name[BUFFMGR_MAX_NAME_LEN];
}buffmgr_user_stats_t;
```

```
typedef struct {
    buffmgr_lock_t buf_usage_app_lock;
    list_head_t
    user_head[BUFFMGR_USER_MAX];
    buffmgr_user_stats_t
    user_buf_stats[BUFFMGR_USER_MAX];
    unsigned int appid;
    unsigned char is_app_present;
    char
    app_name[BUFFMGR_MAX_NAME_LEN];
}buffmgr_app_usage_t;
```

```
typedef struct {
    buffmgr_app_usage_t
    app_list[BUFFMGR_APP_MAX];
    unsigned char app_count;
}buffmgr_usage_t;
```

FIG. 12

Using following CLIs buffer usage for each user (USERID) across the multiple driver and process/apps can be displayed :FID128:root> buffmgr show stats

| PoolId | Size | Total | Free | In-use | Out-of-buf | Bad-free | Bad-ref | Bad-sig |
|---|---|---|---|---|---|---|---|---|
| 0 | 256 | 2047 | 2047 | 0 | 0 | 0 | 0 | 0 |
| 1 | 512 | 2048 | 2048 | 0 | 0 | 0 | 0 | 0 |
| 2 | 1024 | 2048 | 2048 | 0 | 0 | 0 | 0 | 0 |
| 3 | 2048 | 12288 | 12288 | 0 | 0 | 0 | 0 | 0 |
| 4 | 10240 | 1400 | 1172 | 228 | 0 | 0 | 0 | 0 |

| | | | |
|---|---|---|---|
| Free AppId Invalid | : | 0 Free AppId Not Owner : | 0 |
| Free UserId Invalid | : | 0 Free UserId Not Owner : | 0 |
| Get App Ref Error | : | 0 Inc App Ref Error : | 0 |
| Buf Ownership Error | : | 0 UserId Entry Add Error : | 0 |
| Invalid Buf Error | : | 0 Invalid From UserId Error : | 0 |
| Buff User Threshold Err: | | 0 Alloc free count mismatch : | 0 |

| AppName | AppId | Total | Free | In-use |
|---|---|---|---|---|
| hslagtd | 2653 | 10367 | 10159 | 208 |
| l2agtd | 2654 | 18 | 0 | 18 |
| qosagtd | 2659 | 300 | 300 | 0 |
| fibagt | 2660 | 6 | 5 | 1 |
| openflowagt | 2662 | 1 | 1 | 0 |
| tnlagtd | 2661 | 1 | 0 | 1 |

FIG. 13

```
[FID128:root> buffmgr show apps

UserName    UserId   Total    Free     In-use   Peak-use

#AppName: hslagtd   (2653)
fbr-rx       2       1468     1276     192      192
fbr-tx       3       2533     2533     0        0
hslagent     4       15       0        15       15
l3hsl-cosop  7       6        5        1        1
hslagent     13      2533     2533     0        1
hslua-rx     25      1276     1276     0        0
hslua-tx     26      2533     2533     0        0

#AppName: l2agtd    (2654)
l2agent      5       18       0        18       18

#AppName: qosagtd   (2659)
QOSAGT       8       300      300      0        1

#AppName: fibagt    (2660)
l3fib-cosop  6       6        5        1        2

#AppName: openflowagt(2662)
ofagt        10      1        1        0        1

#AppName: tnlagtd   (2661)
tnlagtd      11      1        0        1        1
```

FIG. 14

```
sw0:FID128:root> buffmgr show buff-info 4B2AD800
 Inputs buf_ptr:0x4B2AD800
[ Buffer info ]
 poolid:4 len:8888 pbuf:0x492387F0 buf:0x4B2AD800 payload:0x4B2AD800
 ref:1 app_ref:1 valid:0x1234BBBB flags:0x0 userid:2 user_name:     ipm2
 #user buff ref list:
 userid: 2 ref: 1
[ User alloc stack ]
 appid:32008 appname:   ipmtest
<FFDD040<FFDC430<10003A24<FFA7E58<FF07B08
[ Buff data (dump size:256 bytes) ]
  0000: 31 32 33 34 35 61 62 63-64 65 66 31 32 33 34 35
12345abcdef12345
  0010: 36 61 62 63 64 65 66 31-32 33 34 35 36 37 38 39
6abcdef123456789
  0020: 61 62 63 64 65 66 67 68-31 32 33 34 35 36 37 38
abcdefgh12345678
  0030: 39 61 62 63 64 65 66 67-68 69 6b 6a 00 00 00 00 9abcdefghikj....
  0040: 00 00 00 00 00 00 00 00-00 00 00 00 00 00 00 00 ................
  0050: 00 00 00 00 00 00 00 00-00 00 00 00 00 00 00 00 ................

sw0:FID128:root> buffmgr_stack_decode hsltest
"<FFDD040<FFDC430<10002A18<100025D8<FE48AA4<FE48C74"
 [BUFFMGR user callstack summary]
<??<??<buffmgr_ut<main<??<??

[BUFFMGR user callstack with File name:Line number]
??:0
buffmgr_ut
debug/buffmgr_test.c:180
main
debug/buffmgr_utils.c:534
??
??:0
```

FIG. 15

```
:FID128:root> buffmgr show apps

UserName      UserId   Total    Free    In-use   Peak-use

#AppName: hslagtd     (2653)
fbr-rx           2      1468    1276     192      192
fbr-tx           3      2533    2533      0        0
hslagent         4        15       0     15       15
l3hsl-cosop      7         6       5      1        1
hslagent        13      2533    2533      0        1
hslua-rx        25      1276    1276      0        0
hslua-tx        26      2533    2533      0        0

#AppName: l2agtd      (2654)
l2agent          5        18       0     18       18

#AppName: qosagtd     (2659)
QOSAGT           8       300     300      0        1

#AppName: fibagt      (2660)
l3fib-cosop      6         6       5      1        2

#AppName: openflowagt(2662)
ofagt           10         1       1      0        1

#AppName: tnlagtd     (2661)
tnlagtd         11         1       0      1        1
```

FIG. 16

BUFFER MANAGER

CROSS-REFERENCES TO RELATED APPLICATIONS

This application is a (bypass) continuation of International Application No. PCT/US2017/030244, filed Apr. 28, 2017, entitled, "BUFFER MANAGER," which claims benefit and priority of Indian Provisional Application No. 201641018588, filed May 31, 2016, entitled, "BUFFER MANAGER." The entire content of the PCT/US2017/030244 and 201641018588 applications are incorporated herein by reference for all purposes.

BACKGROUND

The present disclosure generally relates to computing devices and systems, and more specifically, improving use and sharing of data between different processing entities/agents on a computing device.

Traditionally, computing devices have an operating system executing from memory on one or more processing entities, such as processing cores. Such operating systems have segmented and isolated boundaries within the executing software or instructions. Such segmentation of the executing software may be implemented using software and/or hardware mechanisms. The segmentation and isolation of certain sections of the executing software allow for secure execution of machine critical tasks. Such segmentation and isolation of the executing software generally result in instructions executing in different privilege levels from different areas of memory.

Although, in certain instances, different software agents operating with different privileges may increase stability of the system, it can also result in increased overhead of communication between different agents operating at different privileges or even at the same privilege. One such example is sharing data between different agents in an operating environment. In many instances, the agents are forced to copy the entire data to their local memory space before the agent can use or work on the dataset. If multiple agents are required to work on the same dataset sequentially, the dataset is traditionally copied over and over again resulting in degraded performance of the system.

SUMMARY

Systems, methods, apparatus, and computer-readable medium are described for improving efficiency and robustness for sharing data between different processing entities/agents on a computing device.

In certain embodiments, a device may include memory that stores a buffer management pool that includes a metadata list and a buffer pool. A buffer pool may be a plurality of buffers. The metadata list may include a plurality of entries, wherein each entry of the metadata list may be associated with a buffer from the plurality of buffers. The metadata stored at each entry provides information associated with the use of the associated buffer. A buffer manager may be configured to provide an interface to a user (from an agent) for accessing a buffer from the plurality of buffers, wherein the buffer manager manages information associated with any given buffer by updating associated entries for the respective buffer in the metadata list.

In certain embodiments, a device, such as a network device, may include one or more processors configured to execute a buffer manager in kernel mode, a first process in kernel mode and a second process in user mode, wherein the buffer manager manages a plurality of buffers. The first process may be configured to request from the buffer manager access to a first buffer from the plurality of buffers, receive a first address, in response to the request for access to the first buffer, use the first address, from the first process, to access the first buffer, and send the first address from the first process to a second process. Furthermore, the second process is configured to access the first buffer using the first address received from the first process.

In certain embodiments, the device may include memory to store the plurality of buffers comprising the first buffer, and a metadata list comprising a plurality of entries, wherein a first entry from the plurality of entries is accessed using the first address. The first entry may include one or more of the first address, process identifier, timestamp, and validity indicator. In certain embodiments, each entry of the plurality of entries of the metadata list may be associated with a buffer from the plurality of buffers and metadata stored at each entry of the plurality of entries provides information associated with the use of the buffer. The buffer manager may be further configured to provide an interface for accessing the first buffer from the plurality of buffers, wherein the buffer manager manages information associated with the first buffer by updating the entry associated with the first buffer.

In certain embodiments, the virtual address for accessing the first buffer may be fixed to the same virtual address for the first process and the second process. In certain embodiments, a contiguous physical memory block may be allocated for the plurality of buffers and the metadata list. In certain embodiments, a third process using the first address de-allocates use of the first buffer.

In certain embodiments, the device may be a network device and the network device further comprises a network interface configured to receive a network packet at the network interface, a direct memory access engine for transferring a portion of the packet to the first buffer from the plurality of buffers in physical memory using a direct memory access transfer, and the first process and the second process to access the portion of the packet stored in the buffer using the first address. In certain embodiments, the plurality of buffers comprises multiple pools of buffers, wherein a first pool of buffers from the plurality of buffers comprises buffers of a first size, and a second pool of buffers from the plurality of buffers comprises buffers of a second size.

In certain embodiments, the system or device further executes a method using instructions stored on a non-transitory computer readable medium and executed by one or more processors to implement the system or device discussed above and herein. Furthermore, the system or device may comprise a means for performing one or more of the techniques disclosed above.

BRIEF DESCRIPTION OF THE DRAWINGS

FIG. 6 illustrates an example representation of a metadata list entry that is associated with a buffer in the buffer pool.

FIG. 12 illustrates example data structures according to certain aspects of the disclosure.

FIG. 13, FIG. 14, FIG. 15 and FIG. 16 provide illustrations of CLI commands for exposing information from the metadata and/or the buffer.

DETAILED DESCRIPTION

Figure 1:
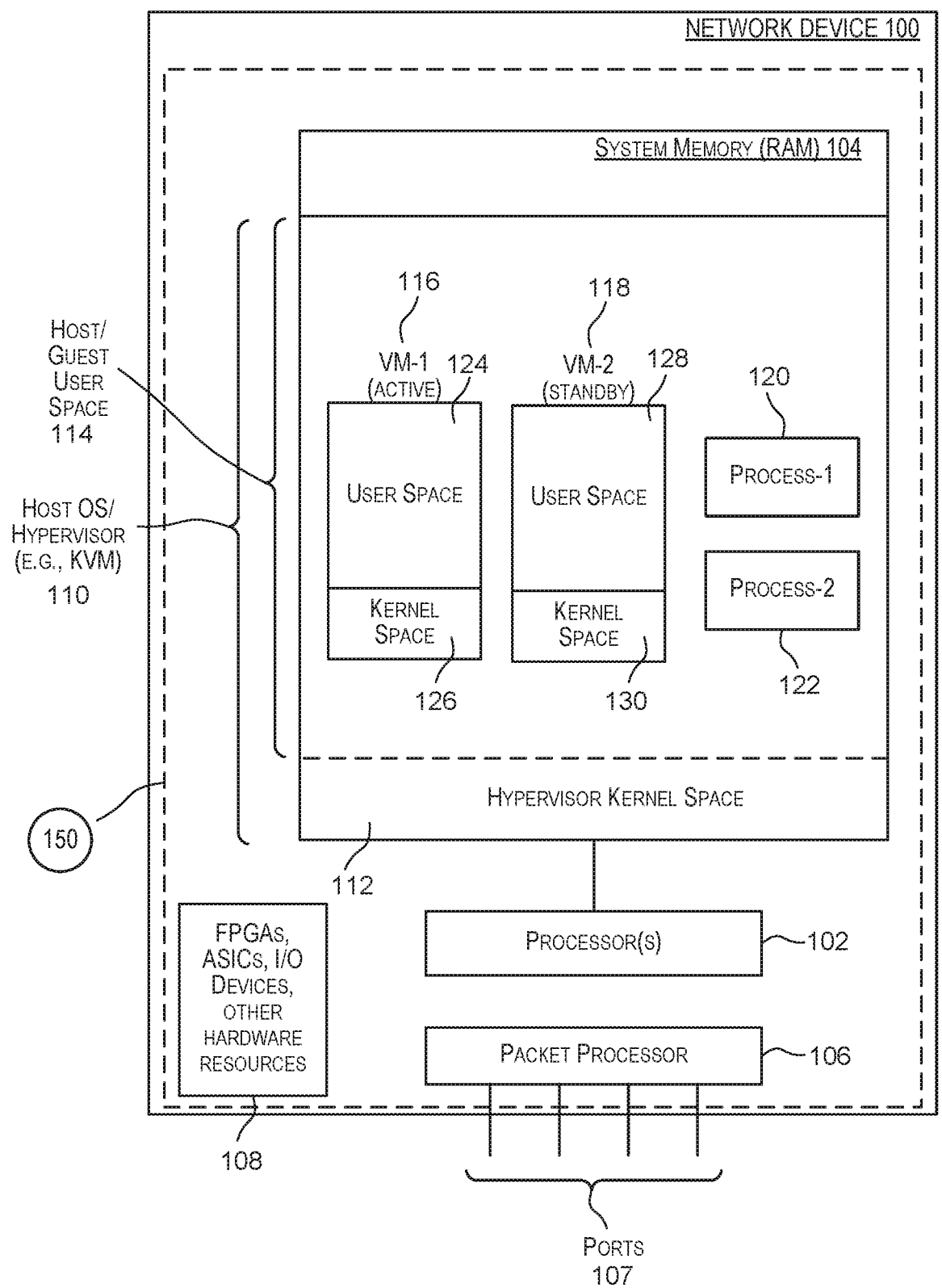
FIG. 1 is a simplified block diagram of a network device that may incorporate teachings disclosed herein according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to improving use and sharing of data between different processing agents on a computing device.

Traditionally, computing devices have an operating system executing from memory on one or more processing entities, such as processing cores. Such operating systems have segmented and isolated boundaries within the executing software or instructions. Such segmentation of the executing software may be implemented using software and/or hardware mechanisms. The segmentation and isolation of certain sections of the executing software allows for secure execution of machine critical tasks. Such segmentation and isolation of the executing software generally result in instructions executing in different privilege levels from different areas of memory.

Although, in certain instances, privilege may increase stability of the system, it can also result in increased overhead of communication between different agents operating at different privileges or even at the same privilege. One such example is sharing data between different agents in an operating environment. In many instances, the agents are forced to copy the entire data to their local allocated memory space before the agent can use or work on the dataset. If multiple agents are required to work on the same dataset sequentially, the data set is traditionally copied over and over again resulting in degraded performance of the system.

In certain instances, "processing agents" or simply "agents" may refer to processes executing on the device. An example of such a process executing in the user space is an application. An example of such a process executing in the kernel space is a driver. Agents have their own dedicated resources and view of the system, such as virtual address space, error handling, etc. Any given agent may have one or more users executing in the agent. A user may be a program executing within the processing environment of the agent. Each agent in the system and each user in the agent may have a unique identifier identifying them.

In certain embodiments disclosed herein, agents and processes may be used interchangeably without deviating from the scope of the disclosure. Furthermore, in certain instances where a user is discussed, similar techniques may be applicable to agents and processes and the user may be interchanged with an agent or process without deviating from the scope of the disclosure.

Systems, methods, apparatus, and computer-readable medium are described for improving sharing of memory across different processing entities in a system. These different processing entities may be users executing at different privilege levels in the system. In certain embodiments, a buffer manager and a buffer pool are disclosed for robust management and access of buffers by the various users in the system. The buffer manager provides centralized control for managing the buffers maintained in the buffer pool. Furthermore, the buffer manager maintains metadata associated with each of the buffers in the buffer pool for providing granulized control and access to the buffers throughout the system.

In certain embodiments described, a pool of buffers is provided for sharing data between several different agents executing in the system. These buffers may be used for sharing direct memory access (DMA) data or non-DMA data. Examples of DMA data may be network packets received at the network port of the device and copied by the hardware itself or software executing from the kernel-space into system memory using DMA. An example of non-DMA data may be messages that are transferred between multiple users executing on the device in various different privilege levels.

In certain embodiments, different buffer sizes may be provided for different data usages by the users. The buffer manager may allocate and maintain such buffers. In certain implementations, a base data unit size may be determined based on the smallest data size for the shared data expected to be used by the users. Larger data buffers may be heuristically determined based on typical packet payloads for a system. In certain instances, such buffer sizes may be pre-determined. The size and usage of the buffers may also determine the number of buffers (i.e., count) for each buffer size. Some non-limiting examples of such buffers are as follows:

256 byte (count=2048)
    512 byte (count=2048)
    1024 byte (count=2048)
    2048 byte (count=6*2048)
    10236 byte (count=512)

In certain implementations, the buffer sizes may be dynamically determined based on the usage models or the types of data requests seen by the buffer manager. For example, if the buffer manager observes network packets with a certain size requirement over a certain period of time, in certain instances, the buffer manager may dynamically allocate buffers of a certain size.

As will be discussed in more detail below, aspects of the embodiment, enable different users (from a different or a same agent) to access the same buffers from the buffer pool executing from any privilege level on the device. Further description is provided below that enables allocation and de-allocation (or freeing) of the buffers from the buffer pool by any user. For example, a first user in the user space can allocate and use a buffer and then pass on a pointer to the buffer to a second user executing in the kernel-space in the system, with more or less no regard for the privilege level. The second user can use the buffer and even de-allocate the buffer, once the data is no longer needed.

Such an implementation supports zero-copy of data. In other words, instead of repeatedly copying the data from one local buffer associated with the first user to another local buffer associated with another user, the data is transferred to memory only once and used again and again from the same buffer by multiple users, until the data is no longer needed. For example, according to certain aspects of the disclosure, a packet or the payload for the packet arriving at the network port is copied to the memory using a DMA transfer only once and then repeatedly used by different users throughout the system for further processing of the packet, without ever copying the data associated with the packet again internally in the system. Reducing and/or eliminating the need for repeatedly copying the same data from one buffer to another in the memory saves valuable time and processing resources.

In certain embodiments, the buffer manager provides a centralized method for controlling the buffer usage on per user and per buffer bases. The buffer manager maintains metadata associated with each buffer that allows for a very granular and centralized control of the buffers by various users.

In certain embodiments, such an implementation of the buffer manager allows the ability to track the use of buffers by the various users in the system allowing for use of the same buffer by any user in the system and proper allocation and de-allocation of the buffers. Such a centralized control also provides for certain embodiments to track the current buffer use since the same buffer is accessed and the control/ownership for the buffer is transferred from one user to another.

Furthermore, this centralized control and sophisticated logging (as disclosed in more detail below) by the buffer manager also enable detecting buffer leaks as soon as the buffers start leaking due to improper use by a buffer and help identify and pinpoint the user that might be causing the leak in the first place. Furthermore, in certain embodiments, buffer usage thresholds and restrictions may be implemented allowing for per user control on the usage of the buffers. A per user and per buffer control may allow for avoiding scenarios where a buffer leakage by a single bad actor has a potential of impacting the general operation of the system. Similarly, the buffer manager can detect and restrict specific users from holding the buffer beyond a particular amount of time.

Such an architecture also increases the ease of debugging a system and acquiring performance statistics regarding the use of buffers by the system, by capturing the overall buffer pool usage, since up to the moment information regarding the ownership, timing, and usage for the buffer is available through the metadata maintained for the buffer by the buffer manager. For example, the buffer manager can get the buffer user call stack to identify specific users for the buffers. Furthermore, if two users attempt to free the same buffer (also known as double buffer free), the buffer manager may detect such a scenario and take appropriate actions. In a catastrophic event, where the owner of the buffer is killed, the buffer manager can detect such a scenario and de-allocate the buffer associated with the user for future use by other users.

FIG. 1 is a simplified block diagram of a network device 100 (also referred to as a "host system") that may incorporate teachings disclosed herein according to certain embodiments. Network device 100 may be any device that is capable of receiving and forwarding packets, which may be data packets or signaling or protocol-related packets (e.g., keep-alive packets). For example, network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif.

As depicted in FIG. 1, the example network device 100 comprises multiple components including one or more processors 102, a system memory 104, a packet processor 106 (which may also be referred to as a traffic manager), and optionally other hardware resources or devices 108. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components. Network device 100 depicted in FIG. 1 may also include (not shown) one or more communication channels (e.g., an interconnect or a bus) for enabling multiple components of network device 100 to communicate with each other.

Network device 100 may include one or more processors 102. Processors 102 may include single or multicore processors. System memory 104 may provide memory resources for processors 102. System memory 104 is typically a form of random access memory (RAM) (e.g., dynamic random access memory (DRAM), Synchronous DRAM (SDRAM), Double Data Rate SDRAM (DDR SDRAM)). Information related to an operating system and programs or processes executed by processors 102 may be stored in system memory 104. Processors 102 may include general purpose microprocessors such as ones provided by Intel®, AMD®, ARM®, Freescale Semiconductor, Inc., and the like, that operate under the control of software stored in associated memory.

As shown in the example depicted in FIG. 1, a host operating system 110 may be loaded in system memory 104 and executed by one or more processors 102. Host operating system 110 may be loaded, for example, when network device 104 is powered on. In certain implementations, host operating system 110 may also function as a hypervisor and facilitate management of virtual machines and other programs that are executed by network device 100. Managing virtual machines may include partitioning resources of network device 100, including processor and memory resources, between the various programs. A hypervisor is a program that enables the creation and management of virtual machine environments including the partitioning and management of processor, memory, and other hardware resources of network device 100 between the virtual machine environments. A hypervisor enables multiple guest operating systems (GOSs) to run concurrently on network device 100.

As an example, in certain embodiments, host operating system 110 may include a version of a KVM (Kernel-based Virtual Machine), which is an open source virtualization infrastructure that supports various operating systems including Linux, Windows®, and others. Other examples of hypervisors include solutions provided by VMWare®, Xen®, and others. Linux KVM is a virtual memory system, meaning that addresses seen by programs loaded and executed in system memory are virtual memory addresses that have to be mapped or translated to physical memory addresses of the physical memory. This layer of indirection enables a program running on network device 100 to have an allocated virtual memory space that is larger than the system's physical memory.

In the example depicted in FIG. 1, the memory space allocated to operating system 110 (operating as a hypervisor) is divided into a (hypervisor) kernel space 112 and a user space 114 (also referred to as host user space or guest user space). Multiple virtual machines and host processes may be loaded into guest user space 114 and executed by processors 102. The memory allocated to a virtual machine (also sometimes referred to as a guest operating system or GOS) may in turn include a kernel space portion and a user space portion. A virtual machine may have its own operating system loaded into the kernel space of the virtual machine. A virtual machine may operate independently of other virtual machines executed by network device 100 and may be unaware of the presence of the other virtual machines.

A virtual machine's operating system may be the same as or different from the host operating system 110. When multiple virtual machines are being executed, the operating system for one virtual machine may be the same as or different from the operating system for another virtual machine. In this manner, operating system 110, for example through a hypervisor enables multiple guest operating systems to share the hardware resources (e.g., processor and memory resources) of network device 100.

For example, in the embodiment depicted in FIG. 1, two virtual machines VM-1 116 and VM-2 118 have been loaded into user space 114 and are being executed by processors 102. VM-1 116 has a guest kernel space 126 and a guest user space 124. VM-2 118 has its own guest kernel space 130 and guest user space 128. Typically, each virtual machine has its own secure and private memory area that is accessible only to that virtual machine. In certain implementations, the creation and management of virtual machines 116 and 118 may be managed by hypervisor running on top of or in conjunction with the operating system 110. The virtualization infrastructure can be provided, for example, by KVM. While only two virtual machines are shown in FIG. 1, this is not intended to be limiting. In alternative embodiments, any number of virtual machines may be loaded and executed.

Various other host programs or processes may also be loaded into user space 114 and be executed by processors 102. For example, as shown in the embodiment depicted in FIG. 1, two host processes 120 and 122 have been loaded into user space 114 and are being executed by processors 102. While only two host processes are shown in FIG. 1, this is not intended to be limiting. In alternative embodiments, any number of host processes may be loaded and executed.

In certain embodiments, a virtual machine may run a network operating system (NOS) (also sometimes referred to as a network protocol stack) and be configured to perform processing related to forwarding of packets from network device 100. As part of this processing, the virtual machine may be configured to maintain and manage routing information that is used to determine how a data packet received by network device 100 is forwarded from network device 100. In certain implementations, the routing information may be stored in a routing database (not shown) stored by network device 100. The virtual machine may then use the routing information to program a packet processor 106, which then performs packet forwarding using the programmed information, as described below.

The virtual machine running the NOS may also be configured to perform processing related to managing sessions for various networking protocols being executed by network device 100. These sessions may then be used to send signaling packets (e.g., keep-alive packets) from network device 100. Sending keep-alive packets enables session availability information to be exchanged between two ends of a forwarding or routing protocol.

In certain implementations, redundant virtual machines running network operating systems may be provided to ensure high availability of the network device. In such implementations, one of the virtual machines may be configured to operate in an "active" mode (this virtual machine is referred to as the active virtual machine) and perform a set of functions while the other virtual machine is configured to operate in a "standby" mode (this virtual machine is referred to as the standby virtual machine) in which the set of functions performed by the active virtual machine are not performed. The standby virtual machine remains ready to take over the functions performed by the active virtual machine. Conceptually, the virtual machine operating in active mode is configured to perform a set of functions that are not performed by the virtual machine operating in standby mode. For example, the virtual machine operating in active mode may be configured to perform certain functions related to routing and forwarding of packets from network device 100, which are not performed by the virtual machine operating in standby mode. The active virtual machine also takes ownership of and manages the hardware resources of network device 100.

Certain events may cause the active virtual machine to stop operating in active mode and for the standby virtual machine to start operating in the active mode (i.e., become the active virtual machine) and take over performance of the set of functions related to network device 100 that are performed in active mode. The process of a standby virtual machine becoming the active virtual machine is referred to as a failover or switchover. As a result of the failover, the virtual machine that was previously operating in active mode prior to the failover may operate in the standby mode after the failover. A failover enables the set of functions performed in active mode to be continued to be performed without interruption. Redundant virtual machines used in this manner may reduce or even eliminate the downtime of network device 100's functionality, which may translate to higher availability of network device 100. The set of functions that is performed in active mode, and which is not performed by the active virtual machine and not performed by the standby virtual machine may differ from one network device to another.

Various different events may cause a failover to occur. Failovers may be voluntary or involuntary. A voluntary failover may be purposely caused by an administrator of the network device or network. For example, a network administrator may, for example, using a command line instruction, purposely cause a failover to occur. There are various situations when this may be performed. As one example, a voluntary failover may be performed when software for the active virtual machine is to be brought offline so that it can be upgraded. As another example, a network administrator may cause a failover to occur upon noticing performance degradation on the active virtual machine or upon noticing that software executed by the active computing domain is malfunctioning.

An involuntary failover typically occurs due to some critical failure in the active virtual machine. This may occur, for example, when some condition causes the active virtual machine to be rebooted or reset. This may happen, for example, due to a problem in the virtual machine kernel, critical failure of software executed by the active virtual machine, and the like. An involuntary failover causes the standby virtual machine to automatically become the active virtual machine.

In the example depicted in FIG. 1, VM-1 116 is shown as operating in active mode and VM-2 118 is shown as operating in standby mode. The active-standby model enhances the availability of network device 100 by enabling the network device to support various high-availability functionality such as graceful restart, non-stop routing (NSR), and the like.

During normal operation of network device 100, there may be some messaging that takes place between the active virtual machine and the standby virtual machine. For example, the active virtual machine may use messaging to pass network state information to the standby virtual machine. The network state information may comprise information that enables the standby virtual machine to become the active virtual machine upon a failover or switchover in a non-disruptive manner. Various different schemes may be used for the messaging, including, but not restricted to, Ethernet-based messaging, Peripheral Component Interconnect (PCI)-based messaging, shared memory based messaging, and the like.

Hardware resources or devices 108 may include without restriction one or more field programmable gate arrays (FPGAs), application specific integrated circuits (ASICs), I/O devices, and the like. I/O devices may include devices such as Ethernet devices, PCI Express (PCIe) devices, and others. In certain implementations, some of hardware resources 108 may be partitioned between multiple virtual machines executed by network device 100 or, in some instances, may be shared by the virtual machines. One or more of hardware resources 108 may assist the active virtual machine in performing networking functions. For example, in certain implementations, one or more FPGAs may assist the active virtual machine in performing the set of functions performed in active mode.

As previously indicated, network device 100 may be configured to receive and forward packets to facilitate delivery of the packets to their intended destinations. The packets may include data packets and signal or protocol packets (e.g., keep-alive packets). The packets may be received and/or forwarded using one or more ports 107. Ports 107 represent the I/O plane for network device 100. A port within ports 107 may be classified as an input port or an output port depending upon whether network device 100 receives or transmits a packet using that port. A port over which a packet is received by network device 100 may be referred to as an input port. A port used for communicating or forwarding a packet from network device 100 may be referred to as an output port. A particular port may function both as an input port and an output port. A port may be connected by a link or interface to a neighboring network device or network. In some implementations, multiple ports of network device 100 may be logically grouped into one or more trunks.

Ports 107 may be capable of receiving and/or transmitting different types of network traffic at different speeds, such as speeds of 1 Gigabits per second (Gbps), 10 Gbps, 100 Gbps, or more. Various different configurations of ports 107 may be provided in different implementations of network device 100. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

In certain implementations, upon receiving a data packet via an input port, network device 100 is configured to determine an output port to be used for transmitting the data packet from network device 100 to facilitate communication of the packet to its intended destination. Within network device 100, the packet is forwarded from the input port to the determined output port and then transmitted or forwarded from network device 100 using the output port.

Various different components of network device 100 are configured to cooperatively perform processing for determining how a packet is to be forwarded from network device 100. In certain embodiments, packet processor 106 may be configured to perform processing to determine how a packet is to be forwarded from network device 100. In certain embodiments, packet processor 106 may be configured to perform packet classification, modification, forwarding and Quality of Service (QoS) functions. As previously indicated, packet processor 106 may be programmed to perform forwarding of data packets based upon routing information maintained by the active virtual machine. In certain embodiments, upon receiving a packet, packet processor 106 is configured to determine, based upon information extracted from the received packet (e.g., information extracted from a header of the received packet), an output port of network device 100 to be used for forwarding the packet from network device 100 such that delivery of the packet to its intended destination is facilitated. Packet processor 106 may then cause the packet to be forwarded within network device 100 from the input port to the determined output port. The packet may then be forwarded from network device 100 to the packet's next hop using the output port.

In certain instances, packet processor 106 may be unable to determine how to forward a received packet. Packet processor 106 may then forward the packet to the active virtual machine, which may then determine how the packet is to be forwarded. The active virtual machine may then program packet processor 106 for forwarding that packet. The packet may then be forwarded by packet processor 106.

In certain implementations, packet processing chips or merchant ASICs provided by various 3rd-party vendors may be used for packet processor 106 depicted in FIG. 1. For example, in some embodiments, Ethernet switching chips provided by Broadcom® or other vendors may be used. For example, in some embodiments, Qumran ASICs may, for example, be used in a pizza-box implementation, or Jericho packet processor chips (BCM88670) may, for example, be used in a chassis-based system, or other ASICs provided by Broadcom® may be used as packet processor 106. In alternative implementations, chips from other vendors may be used as packet processor 106.

Figure 2:
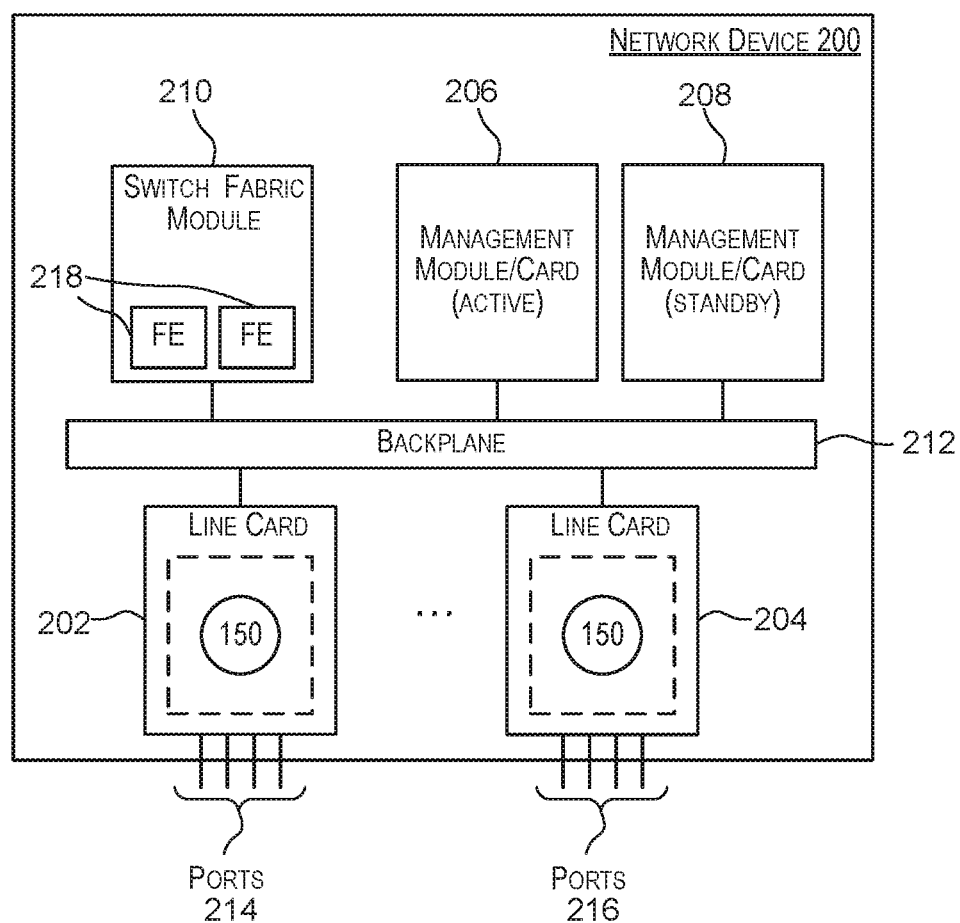
FIG. 2 is a simplified block diagram of yet another example network device.

FIG. 2 is a simplified block diagram of yet another example network device 200. Network device 200 depicted in FIG. 2 is commonly referred to as a chassis-based system (network device 100 depicted in FIG. 1 is sometimes referred to as a "pizza-box" system). Network device 200 may be configured to receive and forward packets, which may be data packets or signaling or protocol-related packets (e.g., keep-alive packets). Network device 200 comprises a chassis that includes multiple slots, where a card or blade or module can be inserted into each slot. This modular design allows for flexible configurations, with different combinations of cards in the various slots of the network device for supporting differing network topologies, switching needs, and performance requirements.

In the example depicted in FIG. 2, network device 200 comprises multiple line cards (including first line card 202 and a second line card 204), two management cards/modules 206, 208, and one or more switch fabric modules (SFMs) 210. A backplane 212 is provided that enables the various cards/modules to communicate with each other. In certain embodiments, the cards may be hot swappable, meaning they can be inserted and/or removed while network device 200 is powered on. In certain implementations, network device 200 may be a router or a switch such as various routers and switches provided by Brocade Communications Systems, Inc. of San Jose, Calif.

Network device 200 depicted in FIG. 2 is merely an example and is not intended to unduly limit the scope of inventive embodiments recited in the claims. One of ordinary skill in the art would recognize many variations, alternatives, and modifications. For example, in some embodiments, network device 200 may have more or fewer components than shown in FIG. 2, may combine two or more components, or may have a different configuration or arrangement of components.

In the example depicted in FIG. 2, network device 200 comprises two redundant management modules 206, 208. The redundancy enables the management modules to operate according to the active-standby model, where one of the management modules is configured to operate in standby mode (referred to as the standby management module) while the other operates in active mode (referred to as the active management module). The active management module may be configured to perform management and control functions for network device 200 and may represent the management plane for network device 200. The active management module may be configured to execute applications for performing management functions such as maintaining routing tables, programming the line cards (e.g., downloading information to a line card that enables the line card to perform data forwarding functions), and the like. In certain embodiments, both the management modules and the line cards act as a control plane that programs and makes programming decisions for packet processors in a network device. In a chassis-based system, a management module may be configured as a coordinator of multiple control planes on the line cards.

When a failover or switchover occurs, the standby management module may become the active management module and take over performance of the set of functions performed by a management module in active mode. The management module that was previously operating in active mode may then become the standby management module. The active-standby model in the management plane enhances the availability of network device 200, allowing the network device to support various high-availability functionality such as graceful restart, non-stop routing (NSR), and the like.

In the example depicted in FIG. 2, management module 206 is shown as operating in active mode and management module 208 is shown as operating in standby mode. Management modules 206 and 208 are communicatively coupled to the line cards and switch fabric modules (SFMs) 210 via backplane 212. Each management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory.

A switch fabric module (SFM) 210 may be configured to facilitate communications between the management modules 206, 208 and the line cards of network device 200. There can be one or more SFMs in network device 200. Each SFM 210 may include one or more fabric elements (FEs) 218. The fabric elements provide an SFM the ability to forward data from an input to the SFM to an output of the SFM. An SFM may facilitate and enable communications between any two modules/cards connected to backplane 212. For example, if data is to be communicated from one line card 202 to another line card 206 of network device 200, the data may be sent from the first line card to SFM 210, which then causes the data to be communicated to the second line card using backplane 212. Likewise, communications between management modules 206, 208 and the line cards of network device 200 are facilitated using SFMs 210.

In the example depicted in FIG. 2, network device 200 comprises multiple line cards including line cards 202 and 204. Each line card may comprise a set of ports that may be used for receiving and forwarding packets. The ports of a line card may be capable of receiving and/or transmitting different types of network traffic at different speeds, such as speeds of 1 Gbps, 10 Gbps, 100 Gbps, or more. Various different configurations of line card ports may be provided in network device 200. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

Each line card may include one or more single or multicore processors, a system memory, a packet processor, and one or more hardware resources. In certain implementations, the components on a line card may be configured similar to the components of network device 100 depicted in FIG. 1 (components collectively represented by reference 150 from FIG. 1 and also shown in line cards 202, 204 in FIG. 2).

A packet may be received by network device 200 via a port (214 and/or 216) on a particular line card. The port receiving the packet may be referred to as the input port and the line card as the source/input line card. The packet processor on the input line card may then determine, based upon information extracted from the received packet, an output port to be used for forwarding the received packet from network device 200. The output port may be on the same input line card or on a different line card. If the output port is on the same line card, the packet is forwarded by the packet processor on the input line card from the input port to the output port and then forwarded from network device 200 using the output port. If the output port is on a different line card, then the packet is forwarded from the input line card to the line card containing the output port using backplane 212. The packet is then forwarded from network device 200 by the packet processor on the output line card using the output port.

In certain instances, the packet processor on the input line card may be unable to determine how to forward a received packet. The packet processor may then forward the packet to the active virtual machine on the line card, which then determines how the packet is to be forwarded. The active virtual machine may then program the packet processor on the line card for forwarding that packet. The packet may then be forwarded to the output port (which may be on the input line card or some other line card) by that packet processor and then forwarded from network device 200 using the output port.

In various implementations, a network device implemented as described in FIG. 1 and/or FIG. 2 may be a chassis-based system. In these implementations, the management modules, line cards, and switch fabric modules can each be "hot-plugged" or "hot-swapped," meaning that these components can be inserted into or removed from the network device while the network device is in operation. The term "hot-plug" can refer to both the physical insertion or removal of a component into a chassis, as well as connecting the devices on the component to a virtual machine (e.g., "virtual" hot-plug in the virtual environment of the virtual machine). In the latter case, the component may be present and powered on in the chassis before the virtual machine is booted, and may be, as discussed further below, undiscoverable to the virtual machine until the virtual machine is on line and able to take steps to make the component visible.

In certain instances, the active virtual machine on an input line card may be unable to determine how to forward a received packet. The packet may then be forwarded to the active management module, which then determines how the packet is to be forwarded. The active management module may then communicate the forwarding information to the line cards, which may then program their respective packet processors based upon the information. The packet may then be forwarded to the line card containing the output port (which may be on input line card or some other line card) and then forwarded from network device 200 via the output port.

Figure 3:
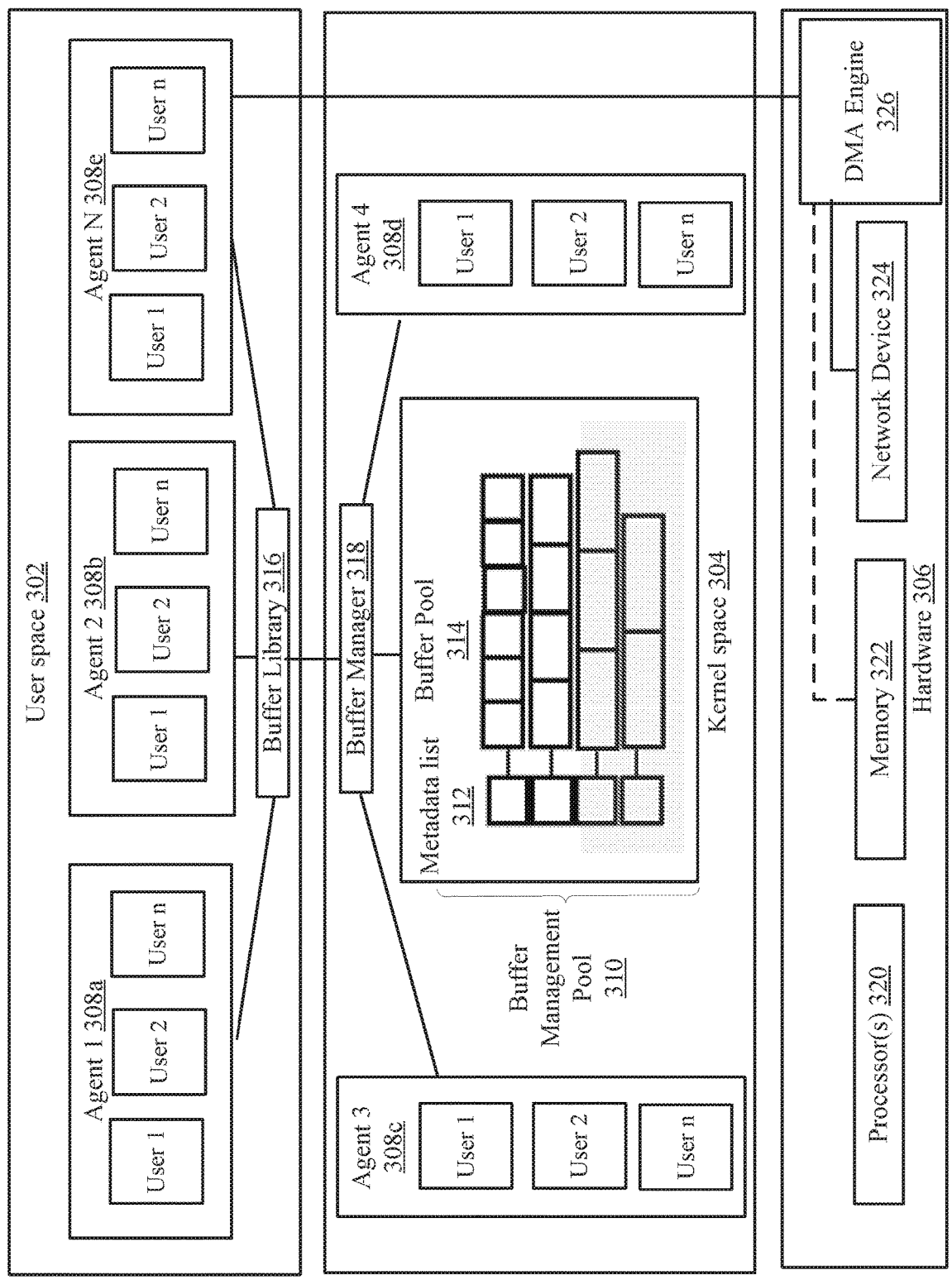
FIG. 3 illustrates an example block diagram, according to certain embodiments of a system for managing buffers.

FIG. 3 illustrates an example block diagram, according to certain embodiments of a system 300 for managing buffers. In certain implementations, the system 300 is a network device. In FIG. 3, the operating environment may be segmented into kernel space 304 and user space 302. The operating environment may be implemented using instructions executing from memory 322 on one or more processors 320 or other processing logic on the hardware 306. In certain implementations, the instructions may be stored on non-transitory computer readable medium. Furthermore, the instructions executing on the system may manipulate data stored in memory 322, such as the buffers in a buffer pool 314 shown in FIG. 3. The kernel space 304 may have additional privileges for accessing hardware 306 and software resources in comparison to the user space.

In certain embodiments, the user space 302 and kernel space 304 may have one or more agents executing in the respective space. As shown in FIG. 3, the user space 302 has agent 1 (308a), agent 2 (308b), and agent N (308e) executing. In certain embodiments, agents executing in the user space 302 may execute as a process and may be referred to as applications. In certain embodiments, a process executing from user space 302 may also be referred to as a process that executes instructions in user mode with user mode privileges. In certain embodiments, instructions executing in user mode may have less privileges as compared to instructions executing in kernel mode. For example, instructions associated with a process executing in user mode may have restrictions on access to portions of the hardware (e.g., memory, processor registers, peripheral devices, etc.). Furthermore, in certain embodiments, instructions associated with a process executing in user mode may not be trusted to interact with the system or other entities, processes, agents or users executing on the same system in a manner that is consistent with the integrity and security of such other actors in the system. In certain embodiments, the system 300 may provide a logical separation or isolation with regard to the memory space for each process to protect the processes from each other. Each agent or application may have its own address space (also referred to as virtual address space) for accessing information (instructions and data) stored in memory 322. In certain implementations, the virtual address space for an agent may be implemented by implementing a dedicated paging structure for the respective agent. Furthermore, each agent may also have one or more users executing as part of the agent.

Furthermore, as shown in FIG. 3, the kernel space 304 may also have several agents executing within the kernel space 304. In certain embodiments, such agents may be referred to as drivers. In certain implementations, agents in kernel space 304, such as drivers, may have higher privileges to resources, such as hardware resources than the agents executing in user space. The agents in the kernel space 304 may also have one or more users executing as part of the agents in the kernel space. In certain embodiments, a process executing from kernel space 304 may also be referred to as a process that executes instructions in kernel mode with kernel mode privileges. In certain embodiments, instructions executing in kernel mode may have more privileges as compared to instructions executing in user mode. For example, instructions associated with a process executing in kernel mode may have access to portions of the hardware (e.g., memory, processor registers, peripheral devices, etc.) that are not accessible to instructions executing in user mode. Furthermore, in certain embodiments, instructions associated with a process executing in kernel mode may be trusted to modify configuration of the system and information associated with other processes (e.g., paging structures) running on the system.

In certain embodiments, a buffer pool 314 is created to manage buffers. As shown in FIG. 3, according to certain embodiments, the buffer pool 314 may have a plurality of buffers of various sizes and metadata associated with each of the buffers. The buffers and the metadata associated with the buffers may allow for granular management of the buffers for the various users executing as part of the various agents across the system and still share the buffers amongst these different users.

In certain embodiments, the buffer manager 318 provides the functionality (also referred to as buffer management logic) for accessing and managing the metadata and buffers in the buffer pool. In certain embodiments, the buffer manager may also be involved in the initialization of the buffer management pool 310 when the system 300 is booting from a power cycle. The buffer manager 318 may provide the interface for the users/agents in the user space 302 and kernel space 304 access to the buffers. The buffer manager 318 may communicate with a buffer library 316 in the user space 302 for providing access to the buffers to the users executing in the user space 302. In certain implementations, the buffer library 316 may provide an application programming interface or API for accessing the buffers. In certain implementations, a similar buffer library may also be implemented in the kernel space 304 to facilitate access to the buffers through the buffer manager 318.

In certain embodiments, the buffer manager 318 simplifies the access to the buffers by the various agents and their users by only providing the agents with access to the buffers through a reference or index, such as memory pointer and enables sharing of the buffer by passing of a pointer from one user to another. However, the buffer manager 318 may internally manage the metadata associated with each of the buffers. The metadata associated with each of the buffers provides the information associated with the buffer, such as the buffer size, location, current allocation state, timestamp of last accessed, current ownership, etc.

In certain embodiments, one or more agents may receive, transmit and/or process network packets. In certain embodiments, such agents may be responsible for network processor configuration, receiving and transmitting packets (using the DMA channel) using buffer manager 318 direct memory access (DMA) buffers. In certain embodiments, aspects disclosed with respect to FIG. 3 may simplify and improve the processing of a network packet. For example, in certain implementations, the network packet may be stored in a buffer allocated using the buffer manager 318 that can be managed by different agents across the system 300. The network packet may arrive at the network device 324 and may be transferred to the allocated buffer using a direct memory access (DMA) engine 326 between the network device 324 and memory 322. Once the network packet is stored in memory, an address (also referred to as a pointer or handle) for the allocated buffer may be shared between the different processes to get access to the network packet. Such an implementation can reduce the latency, power and complexity associated with copying of information between different processes for processing of a network packet.

Figure 4:
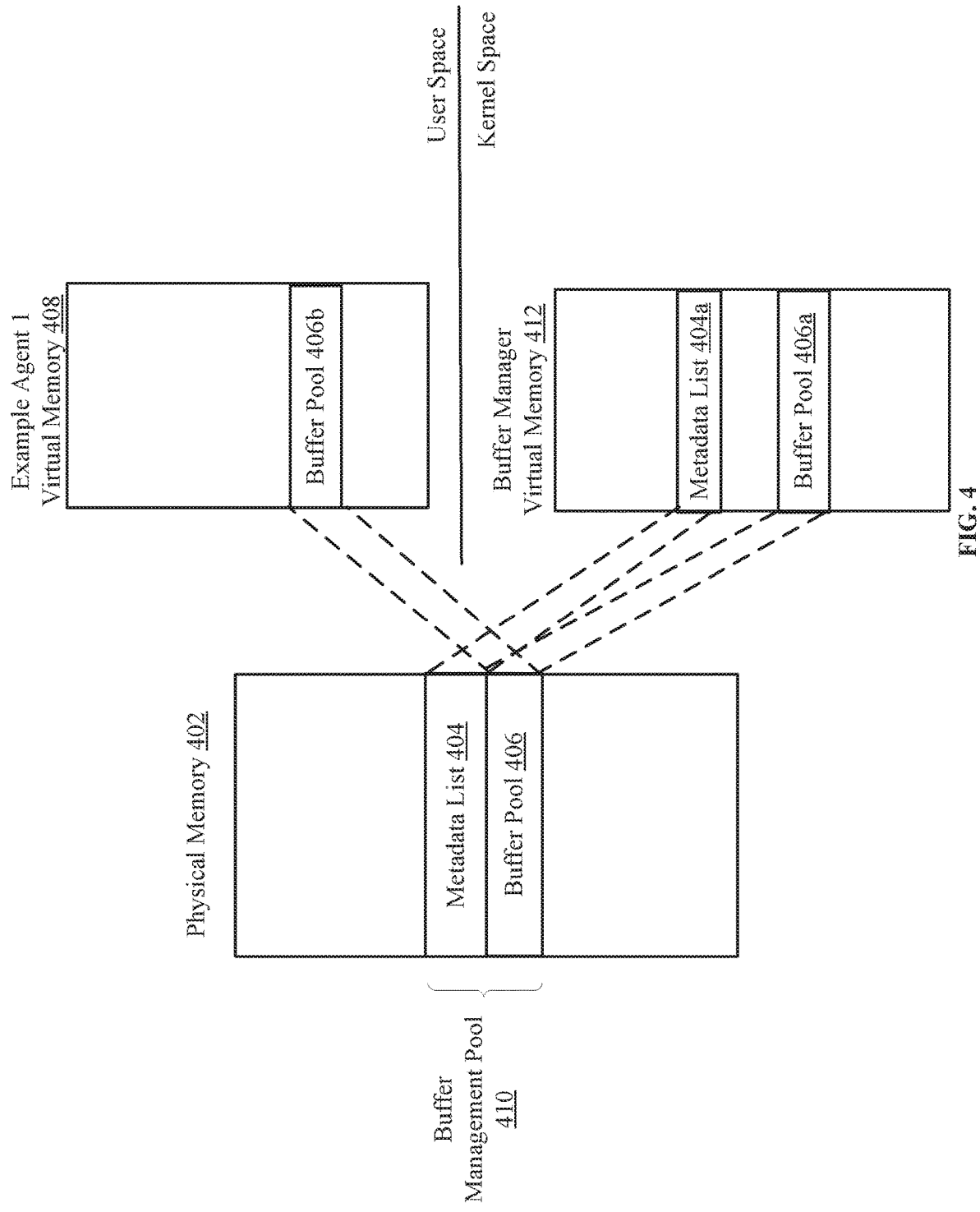
FIG. 4 is an example block diagram illustrating the address space for physical memory of the system and the virtual memory address space for the various agents executing on the system, according to certain aspects of the disclosure.

FIG. 4 is an example block diagram illustrating the address space for physical memory of the system 300 and the virtual memory address space for the various agents executing on the system 300, according to certain aspects of the disclosure. Each agent executing on the system 300 has its own view of the physical memory (via its virtual memory address space) based on the paging table translations provided for the agent. Therefore, traditionally, for different agents, the same physical memory may be mapped to a different virtual address for the agent by the operating system. These translations complicate the ability of an agent (or users executing as part of an agent) to share physical memory.

In certain embodiments, aspects disclosed herein enable sharing of buffers between agents, regardless of if they are executing in user mode (e.g., applications) or kernel (e.g., drivers).

As illustrated in FIG. 4, at boot up time the buffer manager 318 may allocate a large range of contiguous physical memory 402 for the buffer management pool 410. The buffer management pool 410 may be divided into the metadata list 404 and buffer pool 406. Segregating out the metadata list 404 from the buffer pool 406 allows segregated access control for buffer pool 406 and the metadata list 404. For example, the buffer manager 318 provides the agents (e.g., Agent 1) only access to the buffer pool 406, since the buffer manager 318 manages any changes to the metadata associated with the buffers in the buffer pool 406. In certain implementations, the physical memory 402 may be allocated in lower memory so that buffers from the buffer pool 406 can be used for DMA and non-DMA operations, with lower probability of collisions between other memory regions of the operating system and the buffer management pool 410.

The buffer manager 318 may itself map the buffer management pool 410 into its own virtual address space 412, so that the buffer manager 318 can access the metadata list 404 and buffers in the buffer pool 406 in the physical memory 402. The metadata list 404 may have multiple records or entries of metadata, so that each buffer in the buffer pool 406 has its own buffer metadata.

The base address for the buffer pool 406 is mapped to a fixed virtual address (e.g., 406*b* in Agent 1 virtual memory 408) for all the agents and consequently for the users. In other words, each agent requesting allocation or access to the buffers from the buffer pool 406 managed by the buffer manager 318 is assigned a fixed virtual address space 406*b* for all their buffers mapping to the same physical memory space 406 for the buffer pool. Fixing the virtual and physical address space translations allows the buffer manager 318 and the agents/users operating in the user or kernel space to effortlessly transfer control for a buffer by merely transferring a buffer offset for the buffers from one agent/user to another. Each agent can calculate the virtual address for the buffer by using the base virtual address for all the buffers that is fixed for each agent and the buffer offset in the buffer pool 404*b* to get the exact virtual address for the buffer.

Furthermore, as shown in FIG. 4, in certain embodiments, the virtual address space for the entire buffer pool may be reserved in the address space of the buffer manager 412 and the agents (e.g., 408). For example, in FIG. 4, both the agent and the buffer manager may carve out an area of 40 MB from their virtual address space for the buffer pool.

In certain implementations, in order to avoid the fixed virtual address in the agent from overlapping with critical portions of the virtual address space of the agents, such as the agents heap, stack, shared lib, emulated and fixed devices and other mappings, before mapping the fixed virtual address in the agent (during the bring-up process of an agent), a check may be performed to confirm if the fixed virtual address is available for the agent. In certain implementations, this may be performed by completing a virtual memory address (VMA) address lookup.

In one implementation, the buffer manager provides a list process VMA address in-use (for heap, stack, shared lib, device, etc.) whenever buffer manager initialization procedure/function (buffmgr_init( )) is called by the agent. The VMA address list is then compared with the buffer manager 318's fixed virtual address space to check if the fixed virtual address is available before the fixed virtual address space is mapped in the agent's virtual address space.

In certain instances, if the fixed virtual address cannot be mapped for the buffers for an agent, the system will assert an error for the agent and the agent is not started. In other instances, the agent that cannot be mapped to the fixed virtual address for the buffers may continue to operate, but without access to the buffers. In yet another implementation, the buffer manager may perform a reallocation of the fixed virtual address space to an available virtual address block for all the agents running on the system, either dynamically or at next boot-up so that the new agent can also participate in the buffer sharing.

Fixing the virtual address space for accessing the buffers allows all agents to access any particular buffer from the buffer pool using a buffer offset. This allows the buffer allocation to be atomic and highly optimized, since any buffer can be directly accessed with buffer offset and marked as RESERVED or FREE by any agent.

Figure 5:
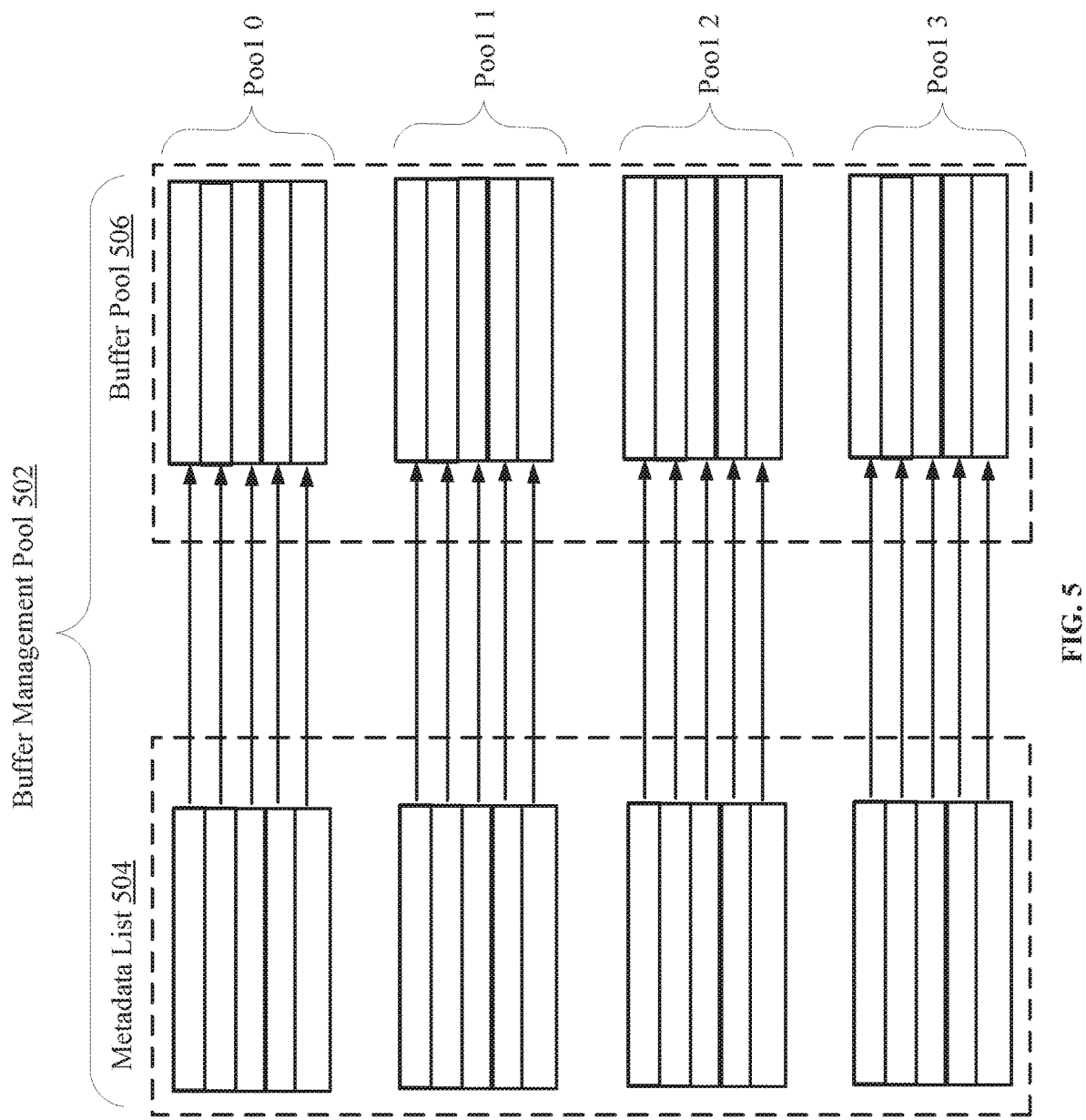
FIG. 5 is a block diagram illustrating an example implementation of the buffer management pool 502.

FIG. 5 is a block diagram illustrating an example implementation of the buffer management pool 502. The buffer management pool 502 is an example implementation of the buffer management pool 310 of FIG. 3 or the buffer management pool of FIG. 4. As previously discussed, in certain embodiments, the physical memory for the buffer management pool 502 may be allocated during the boot-up process of the system. In certain embodiments, memory for a metadata list 504 and a buffer pool 506 are allocated as part of the boot-up process. In certain embodiments, one contiguous physical memory region may be allocated for the metadata list 504 and the buffer pool 506.

In certain embodiments, the buffer pool 506 may be divided into several buffers of different sizes. The size of each buffer may be a multiple of a smallest unit for the buffer pool 506. The smallest unit for the buffer pool 506 may be determined based on empirical/statistical data, e.g., average size of packets received. Buffers of the same size may be pooled together. In one implementation, the smallest buffer size may be 256 bytes. In one implementation, the buffer pool 506 is divided into pools of buffers of different sizes. For example, FIG. 5 discloses 4 different pools (pool 0, pool 1, pool 2 and pool 3), each comprising different sized buffers. In one implementation, pool 0 has buffers of 256 bytes, pool 1 has buffers of 512 bytes (2 units), pool 2 has buffers of 1024 bytes (4 units), and pool 3 has buffers of 10240 bytes (40 units).

In certain implementations, there may be a one-to-one correspondence between each buffer and an entry of the metadata list 504. In other words, each of the metadata entries from the metadata list 504 only points to a single buffer from the buffer pool 306. In certain embodiments, the metadata list 504 may be implemented as a link list.

FIG. 6 illustrates an example representation of a metadata list entry that is associated with a buffer in the buffer pool. The metadata list entry may include metadata associated with the buffer. Metadata may refer to a set of data that gives information associated with the buffer and use of the buffer. For example, the metadata may include a pointer to the next metadata list entry (pbuf* next), a pointer to the buffer (char* buf), start of the payload in the buffer (void* payload), an indicator of the status (free/allocated) of buffer, lock bit, size, timestamp, history of user/process calls using a stack; other configuration flags, and user and application identifiers and names. As discussed in more detail below, information regarding the particular use of the buffer, such as the timestamp, history of user/process calls using a stack, etc., may enable advanced debug capabilities.

Figure 7:
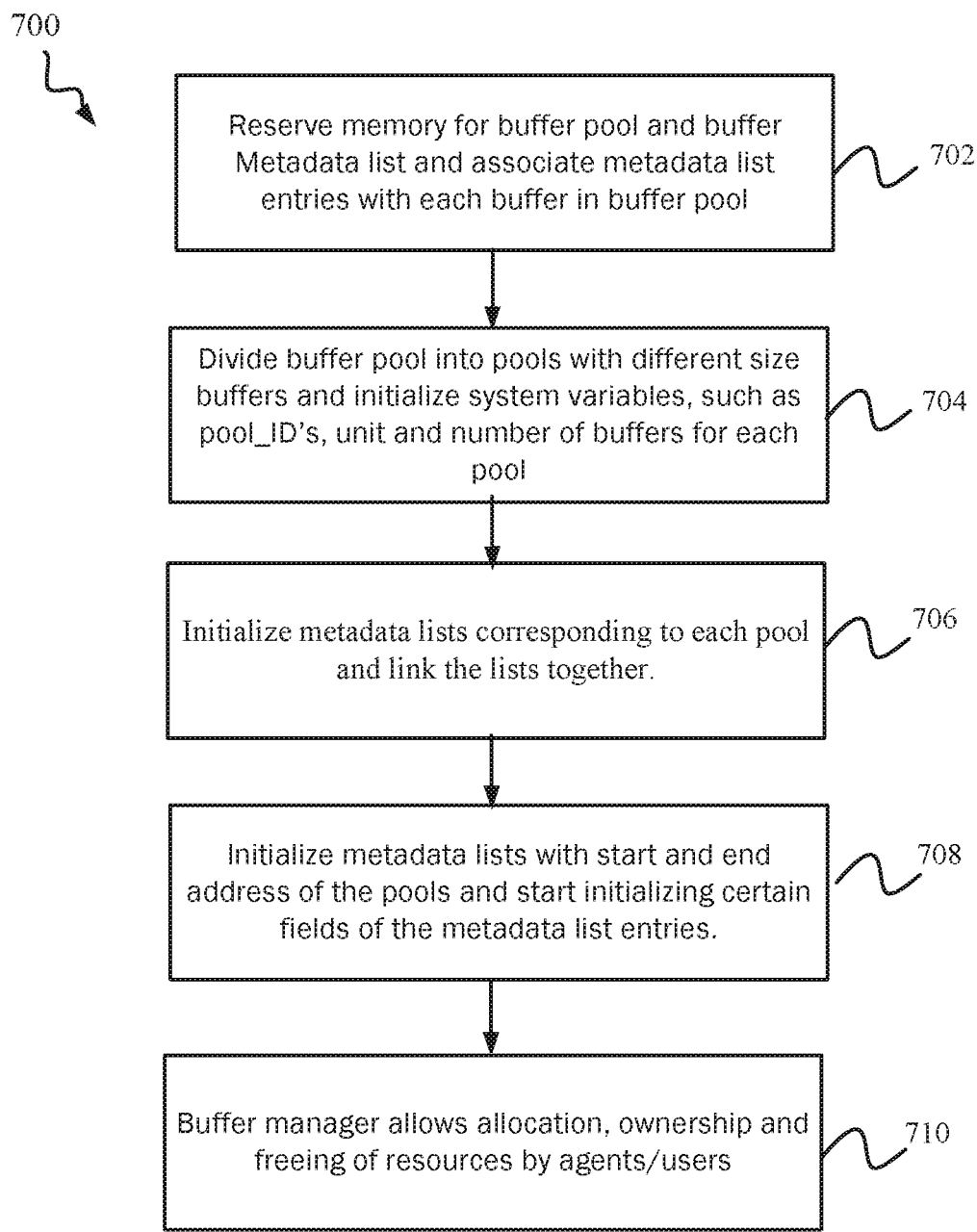
FIG. 7 is an example flow diagram for illustrating an example initialization of the buffer manager and/or the buffer management pool.

FIG. 7 is an example flow diagram for illustrating an example initialization of the buffer manager and/or the buffer management pool. FIG. 7 is a flow diagram illustrating a method 700 for performing embodiments of the invention according to one or more illustrative aspects of the disclosure. According to one or more aspects, any and/or all of the methods and/or method steps described herein may be implemented by and/or in a network device 100, network device 200 or system 300. In one embodiment, one or more of the method steps described below with respect to FIG. 7 are implemented by one or more processors of network device 100, network device 200 or system 300, such as the processors 102, 320 or another processor. Additionally or alternatively, any and/or all of the methods and/or method steps described herein may be implemented in computer-readable instructions, such as computer-readable instructions stored on a computer-readable medium such as the memory 104, 322, storage (not shown) or another computer-readable medium.

At block 702, components of the system may reserve a certain portion of memory 322 in a system 300 for a buffer pool and metadata list. The buffer pool may be byte aligned to the smallest unit (such as 256 bytes). The entries from the metadata list may be associated with a corresponding buffer from the buffer pool. Referring back to FIG. 6, in certain embodiments, this association or mapping may be accomplished by populating the buffer pointer in the pbuf structure. In certain embodiments, this process may be initiated soon after boot up of the device.

At block 704, the buffer pool may be further divided into pools of different pools, each comprising buffers of a certain size. For example, referring back to FIG. 5, in a certain embodiment, the buffer pool may have four different pools with different size buffers (e.g., pool 0-3). Furthermore, other system variables, such as pool_ID, unit and number of buffers reserved for each pool may be determined and configured.

In certain embodiments, the metadata list may be subdivided into separate lists for each of the pools. For example, the metadata list may be represented as metadata_list [Pool_ID]. For example, for the configuration shown in FIG. 5, the metadata list may have four metadata lists, one for each of the pools. At block 706, components may initialize the metadata lists corresponding to each pool and link the lists together.

At block 708, certain fields of the entries of the metadata, similar to some of the fields disclosed in FIG. 6, may be populated. For example, in certain embodiments, the start and end addresses of the metadata lists may be initialized.

At block 710, the buffer management pool may be ready to be managed using allocation procedures from agents/users and ready for ownership and free operations.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 8:
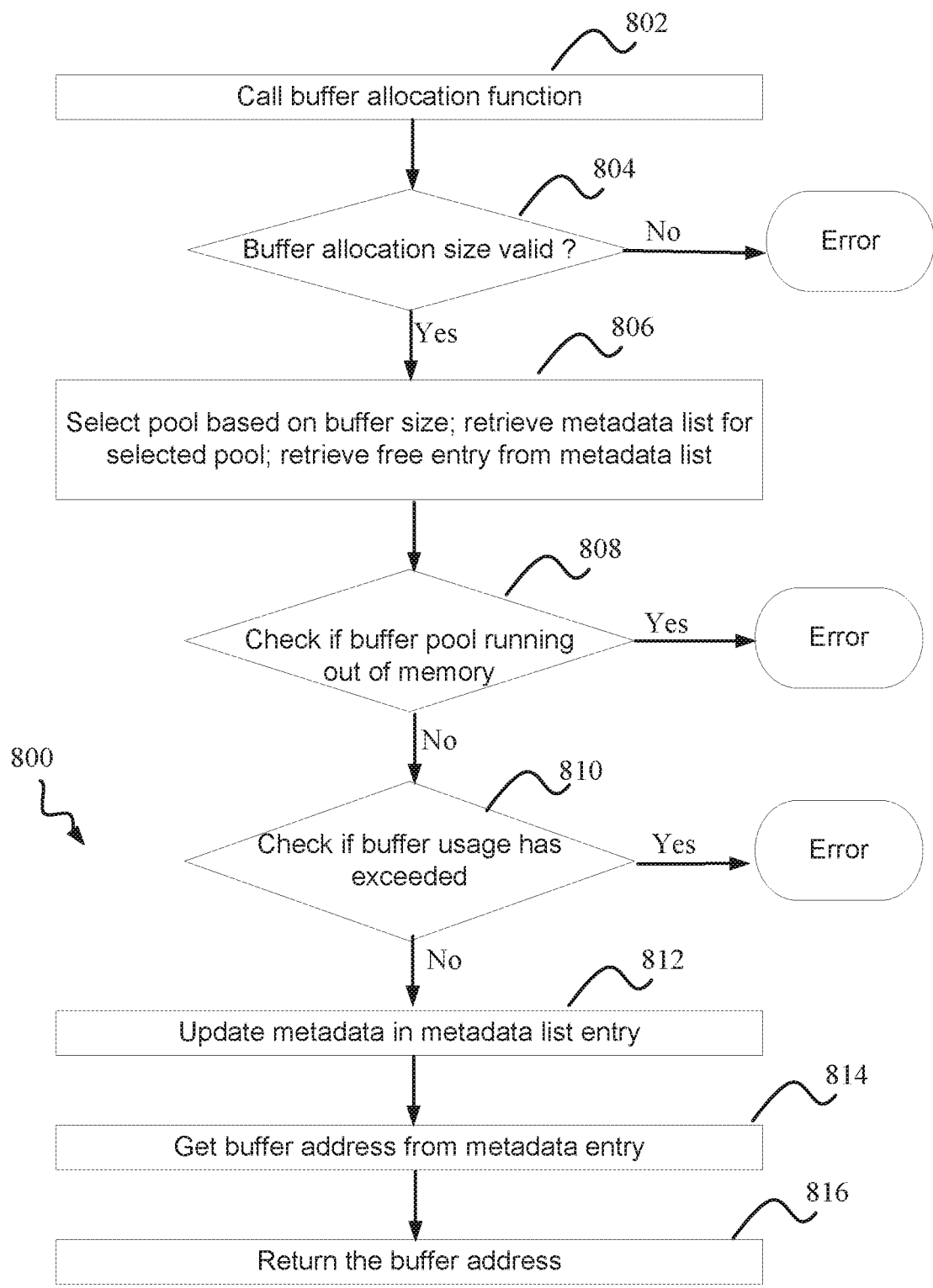
FIG. 8 is an example flow diagram for illustrating an example allocation process for the allocation of a buffer from the buffer pool.

FIG. 8 is an example flow diagram 800 for illustrating an example allocation process for the allocation of a buffer from the buffer pool. According to one or more aspects, any and/or all of the methods and/or method steps described herein may be implemented by and/or in a network device 100, network device 200 or system 300. In one embodiment, one or more of the method steps described below with respect to FIG. 8 are implemented by one or more processors of network device 100, network device 200 or system 300, such as the processors 102, 320 or another processor. Additionally or alternatively, any and/or all of the methods and/or method steps described herein may be implemented in computer-readable instructions, such as computer-readable instructions stored on a computer-readable medium such as the memory 104, 322, storage (not shown) or another computer-readable medium.

At block 802, to allocate a shared buffer, an agent or a user may call an API provided by the buffer library. At block 804, if the buffer size requested is not a valid size, an error may be generated. For example, if the request is for a buffer with a buffer size smaller or larger than a particular threshold, an error may be generated.

At block 806, an appropriate size buffer may be selected from the appropriate buffer pool. The index for the allocated buffer from the pool may be used for indexing into the respective metadata list associated with the selected pool. Once the respective metadata list is selected, a free buffer is selected from the metadata list. In certain embodiments, the metadata list is a linked list and the free buffer is determined by iterating through the linked list.

At block 808, checking if the buffer pool is running out of memory (i.e., allocated buffer space) is performed and an error is indicated if the buffer pool is running out of space. The method may determine that the buffer pool is either out of space or running out based on not being able to retrieve valid pointers for free buffers from the one or more pools.

At block 810, before the buffer is allocated, the buffer usage by the user and in some instances the agent is determined and compared against the usage threshold. If the usage threshold has been violated, an error may be asserted.

At block 812, the method updates metadata in the metadata list entry. For example, the metadata entry may be updated with userID, agentID, timestamp, user call stack and may be marked as reserved. In certain embodiments, the method may also update the statistics for the userID and agentID for further use in debugging and other applications.

At block 814, the method gets the buffer address from metadata entry and updates the metadata entry with the next free entry. At block 816, the method returns the buffer address to the requesting user or agent.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

FIG. 8 is an example flow diagram for illustrating an example allocation process for the allocation of a buffer from the buffer pool. According to one or more aspects, any and/or all of the methods and/or method steps described herein may be implemented by and/or in a network device 100, network device 200 or system 300. In one embodiment, one or more of the method steps described below with respect to FIG. 8 are implemented by one or more processors of network device 100, network device 200 or system 300, such as the processors 102, 320 or another processor. Additionally or alternatively, any and/or all of the methods and/or method steps described herein may be implemented in computer-readable instructions, such as computer-readable instructions stored on a computer-readable medium such as the memory 104, 322, storage (not shown) or another computer-readable medium.

Figure 9:
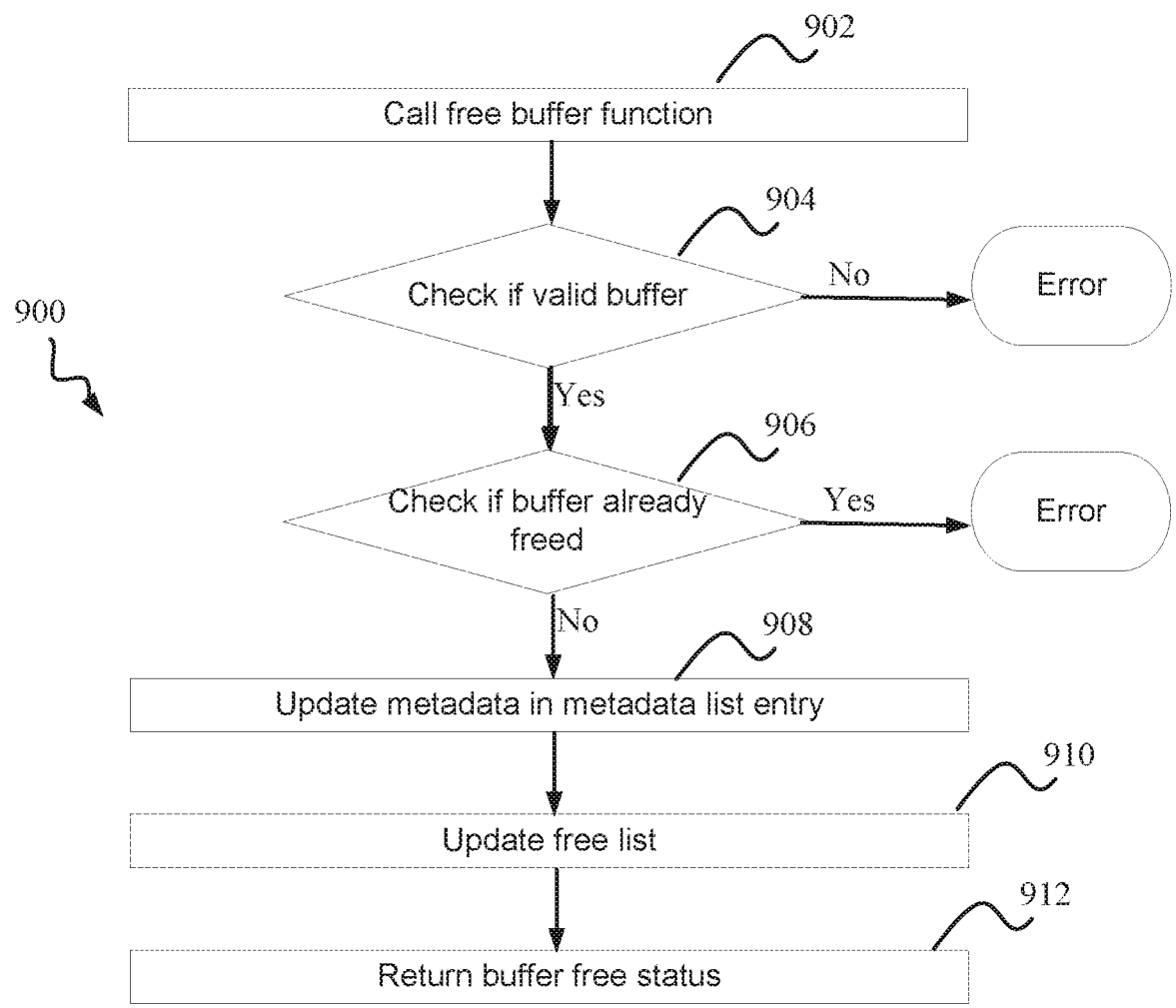
FIG. 9 is an example flow diagram for illustrating an example de-allocation or free operation for a buffer from the buffer pool.

FIG. 9 is an example flow diagram 900 for illustrating an example de-allocation or free operation for a buffer from the buffer pool. In certain embodiments, one agent can allocate a buffer, pass the buffer point to another agent, and another agent can de-allocate or free the buffer.

At block 902, in certain embodiments, the instructions executing from the agent call the free buffer function. In certain implementations, the buffer pointer is derived by right shifting the buffer address by 2 bytes to get the buffer address, since the buffers are 256 byte aligned (bufptr>>=8).

At block 904, if the pbuf is not valid (i.e., pbuff==NULL) or, at block 906), if the buffer is already free (i.e., buffer double free), then the method may signal an error.

At block 906, in certain implementations, based on the error number, the method updates the specific error counter for the userID and agentID and logs the details in the global array regarding the buffer address, userID, agentID, timestamp, user call stack, and buffer usage history with the userID. The error code may be returned to the calling user/agent. The device operator can access the error statistics and log details with buffer manager CLI commands.

At block 908, the metadata (pbuf) for the buffer is updated with the userID, agentID, timestamp, and user call stack. Furthermore, in certain implementations, the free statistics for the userID and agentID are updated and the buffer status is marked as FREE. In certain embodiments, at block 910, the system may maintain a free list for each of pools. Therefore, a list associated with the buffers may be updated upon freeing of the buffer. At block 912, the method may send back the buffer address to the user/agent indicating that the buffer has been freed.

Upon detection of errors, the error number and error counter for specific USER ID and APPLICATION ID and other relevant fields may be updated. In certain embodiments, the error code is returned to the calling user/agent.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Tracking Buffer Usage Across System at Individual User Level in Multiple Driver and Agents In certain embodiments, techniques are described for tracking and restricting user and agent level use of the buffers. New buffer users need to create a unique USER ID (and username) before the user can start using the buffer manager API. The USER ID for the user is registered when the user calls the buffer manager APIs for allocating, taking ownership, or freeing a buffer. The buffer metadata may be tagged/updated with the USER ID, APPLICATION ID, timestamp, and user call stack.

Such an implementation allows an individual buffer to be accessed by multiple users (USERID) and across multiple agents (process/driver). Using the USERID, the usage of the buffers can be tracked. For example, a buffer may be allocated by driver (USERID 1)→App 1. Subsequently, (USERID 2)→App 2 may need access to the same buffer and may request ownership of the buffer by calling the buffer manager API to take ownership. Then, at a later point in time, USERID 3 may free (or deallocate) the same buffer.

Figure 10:
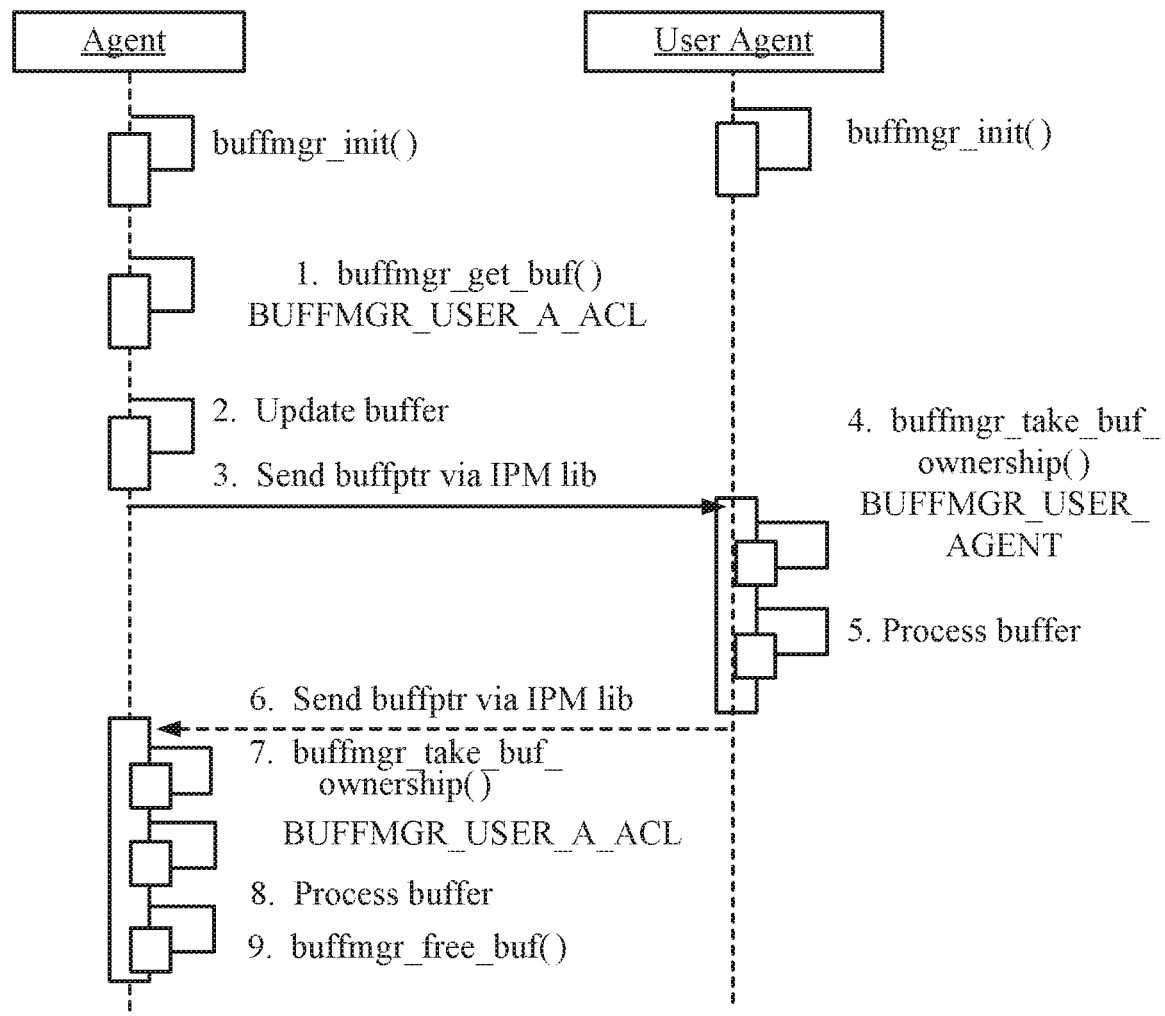
FIG. 10 is an example flow diagram illustrating a use case, according to certain aspects of the invention.

FIG. 10 is an example flow diagram illustrating a use case, according to certain aspects of the invention. This use case demonstrates how an Agent (process 1) and User Agent (process 2) initialize their virtual address space at startup of the process by calling the buffer manager initialization routing (buffmgr_init( )) to make use of shared buffers. At step 1, the Agent allocates the buffer by executing (buffmgr_get_buf( )) and updates the buffer at step 2. At step 3, the Agent sends the buffer pointer via an inter-process messaging (IPM) library to the User Agent. At step 4, the User Agent takes ownership (buffmgr_take_buf_ownership( )) of the buffer to modify the buffer (step 5). At step 6, the User Agent sends back the buffer pointer via IPM library to the Agent. Now again, at step 7, the Agent can take ownership (buffmgr_take_buf_ownership( )) and process the buffer further (step 8). At step 9, the Agent can free/deallocate the buffer by calling the buffer manager API (buffmgr_free_buf( )).

Therefore, ownership for a buffer can move around between multiple agents operating on the device.

Figure 11:
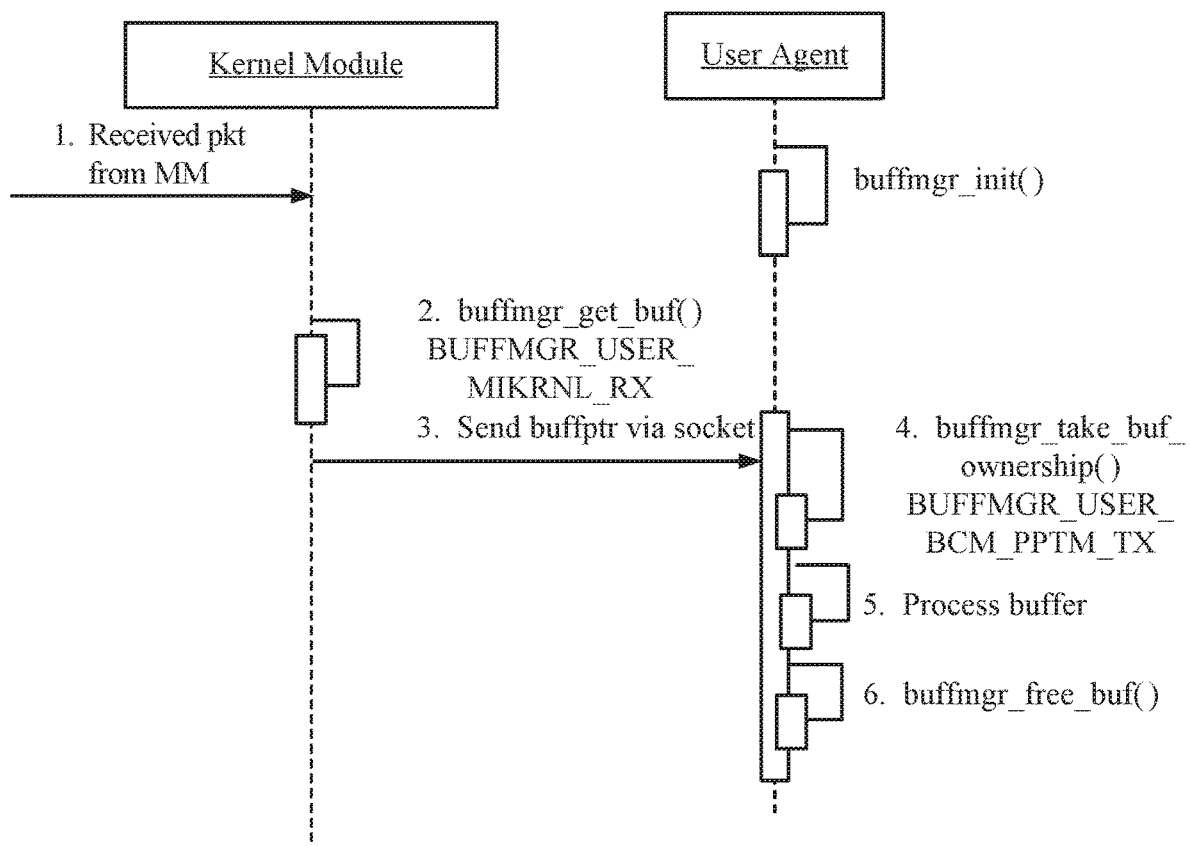
FIG. 11 is an example flow diagram illustrating another use case, according to certain aspects of the invention.

FIG. 11 is an example flow diagram illustrating another use case, according to certain aspects of the invention. FIG. 11 illustrates the process of sharing buffers between a kernel space agent (e.g., driver) and user space agent (e.g., application). Specifically, FIG. 11 illustrates how the Kernel module (Driver) and the User Agent (process) initialize and use buffers and handle receiving of the DMA packet. At step 1, the Kernel module receives the packet from the memory manager. At step 2, the Kernel module allocates a buffer (buffmgr_get_buf( )) to process the packet. At step 3, the Kernel module sends the buffer pointer via socket to the User Agent. In certain embodiments, a socket is an inter-process communication (IPC) means for transferring data between endpoint processes. The User Agent is already initialized by the buffer manager with the appropriately mapped virtual address space to access the buffers (buffmgr_init( )). At step 4, the User Agent takes ownership of the buffer (buffmgr_take_buf_ownership( )) and processes the packets stored in the buffer (Step 5). At step 5, the User Agent consumes the packet in the buffer and frees the buffer (buffmgr_free_buf( )).

FIG. 12 illustrates example data structures according to certain aspects of the disclosure. In certain implementations, for each agent (process/application), buffer usage level statistics get accounted for each USERID and are maintained in data structures such as the data structures depicted in FIG. 12—buffmgr_user_stats_t and buffmgr_app_usage_t. Various command line interface (CLI) commands, as illustrated in FIG. 13 and FIG. 14, may be used by an operator or another monitoring entity to determine the statistics associated with the buffer usage. In one implementation, the buffer manager provides or facilitates the API for retrieving these statistics. In FIG. 13, CLIs can be used to show statistics for each user (USERID) across the multiple agents.

Debug Capabilities to Detect Buffer Leakage, Over Usage, Long Holding, and Get User Call Stack In certain embodiments, a global threshold may be set to detect buffer leakage and over-usage by setting the max buffer allocation and/or ownership by any given user (via USERID). For example, a user may be restricted using a threshold of 300. At any point in time, when the user allocation of ownership for a buffer exceeds the max buffer usage threshold, further buffer allocations for that USERID may fail, unless the user releases buffers that will allow the user to allocate new buffers.

Such an approach may help users/operators/monitoring agents to quickly detect buffer leakage or over usage scenarios for a specific USERID and take corrective actions to avoid reoccurrence of such instances.

Further triggers may be setup to detect using agents/users holding buffers more than a set time period. In certain embodiments, the timestamp, recorded during allocation and ownership requests from users/agents, in the metadata, may be used to identify if certain buffers are being misused, overused or being held for longer periods of time than desired. Such information may help operators and/or developers quickly root out causes and solve issues regarding the operating of the device and agents executing on the device.

While calling buffer management routines, such as allocation, taking ownership and freeing APIs, the user call stack is captured and may be stored in related buffer metadata. In instances of buffer misuse errors, the operator/monitoring agent can inspect the user call stack specific to a user in the agent (driver/application) and determine the root cause of the issue, reducing debug and development time.

FIG. 15 and FIG. 16 provide additional illustrations of CLI commands for exposing information from the metadata and the buffer itself.

In certain implementations, certain buffer manager flags may be used in the allocation process to request special buffers, such as DMA buffers that may be used for DMA device handling. Another flag may indicate special buffers that are not de-allocated once allocated. Such buffers may be used for debugging/tracking. Such buffers may also be excluded from other hold restrictions that may be enforced on other buffers. Furthermore, some buffers may be allocated such that many software modules may use and/or update the buffer. For such buffers, no one entity owns the buffer, but all the entities use the buffers concurrently (e.g., device synchronization). For such buffers, the buffers may be allocated using special flags. Such buffers may also be freed by any agent, since no one agent owns the buffer. Furthermore, certain buffers may be initialized in such a manner that their ownership and usage are not tracked.

During process/app crash or kill scenarios, all buffer manager buffer resources may be freed and given back to buffer pool. To achieve this, the buffer manager library traps a signal and releases process/app specific buffers using buffmgr_release_all_appid_buff( ).

In certain embodiments, a non-transitory machine-readable or computer-readable medium is provided for storing data and code (instructions) that can be executed by one or more processors. Examples of non-transitory machine-readable or computer-readable media include memory disk drives, Compact Disks (CDs), optical drives, removable media cartridges, memory devices, and the like. A non-transitory machine-readable or computer-readable medium may store the basic programming (e.g., instructions, code, program) and data constructs, which, when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device, but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including, but not limited to, conventional techniques for inter-process communications, and different pairs of processes may use different techniques, or the same pair of processes may use different techniques at different times.

The specifications and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A device comprising:
one or more processors configured to execute a buffer manager in kernel mode, a first process in kernel mode and a second process in user mode, wherein the buffer manager manages a plurality of buffers;
the first process is configured to:
request from the buffer manager access to a first buffer from the plurality of buffers, a base address for the plurality of buffers being mapped to a fixed virtual address wherein the buffer manager assigns the fixed virtual address to each process requesting access to the plurality of buffers for all buffers in the plurality of buffers mapping to a same physical memory space, wherein fixing the virtual and physical address translation allows transfer of control for a buffer by transferring a buffer offset, wherein each process calculates the virtual address for the buffer based on the base address for each process and the buffer offset;
receive a first address in response to the request for access to the first buffer;
use the first address from the first process to access the first buffer; and
send the first address from the first process to a second process;
the second process is configured to access the first buffer using the first address received from the first process; and
a third process, using the first address, de-allocates use of the first buffer.

2. The device of claim 1, comprising memory configured to store
the plurality of buffers comprising the first buffer; and
a metadata list comprising a plurality of entries, wherein a first entry from the plurality of entries is accessed using the first address.

3. The device of claim 2, wherein the first entry includes the first address for accessing the first buffer.

4. The device of claim 2, wherein the first entry includes one or more of process identifier, timestamp, and validity indicator.

5. The device of claim 2, wherein each entry of the plurality of entries of the metadata list is associated with a buffer from the plurality of buffers and metadata stored at each entry of the plurality of entries provides information associated with using of the respective buffer.

6. The device of claim 2, wherein the buffer manager is further configured to provide an interface for accessing the first buffer from the plurality of buffers, wherein the buffer manager manages information associated with the first buffer by updating the first entry associated with the first buffer.

7. The device of claim 1, wherein a contiguous physical memory block is allocated for the plurality of buffers and the metadata list.

8. The device of claim 1, wherein the device is a network device and the network device further comprises:
a network interface configured to receive a network packet at the network interface;
a direct memory access engine for transferring a portion of the network packet to the first buffer from the plurality of buffers in physical memory using a direct memory access transfer; and
the first process and the second process to access the portion of the network packet stored in the first buffer using the first address.

9. The device of claim 1, wherein the plurality of buffers comprises multiple pools of buffers, wherein
a first pool of buffers from the plurality of buffers comprises buffers of a first size; and a second pool of buffers from the plurality of buffers comprises buffers of a second size.

10. The device of claim 1, wherein a plurality of users is configured to access a buffer using an interface provided by the buffer manager.

11. The device of claim 1, wherein each of a plurality of users is executing in a different process.

12. A method comprising:
executing, on one or more processors, a buffer manager in kernel mode, a first process in kernel mode and a second process in user mode, wherein the buffer manager manages a plurality of buffers;
requesting, from the first process, access to a first buffer from the plurality of buffers, a base address for the plurality of buffers being mapped to a fixed virtual address wherein the buffer manager assigns the fixed virtual address to each process requesting access to the plurality of buffers for all buffers in the plurality of buffers mapping to a same physical memory space, wherein fixing the virtual and physical address translation allows transfer of control for a buffer by transferring a buffer offset, wherein each process calculates the virtual address for the buffer based on the fixed virtual address for each process and the buffer offset;
receiving a first address at the first process for accessing the first process;
using, by the first process, the first address to access the first buffer;
sending, by the first process, the first address from the first process to a second process;
receiving, by the second process, the first address to access the first buffer using the first address received from the first process; and
by a third process, using the first address, de-allocating use of the first buffer using the first address.

13. The method of claim 12, comprising accessing a metadata list comprising a plurality of entries, wherein a first entry from the plurality of entries is accessed using the first address.

14. The method of claim 13, wherein the first entry includes one or more of the first address, process identifier, timestamp, and validity indicator.

15. The method of claim 13, wherein each entry of the plurality of entries of the metadata list is associated with a buffer from the plurality of buffers and metadata stored at each entry of the plurality of entries provides information associated with using of the respective buffer.

16. The method of claim 13, wherein the buffer manager is further configured to provide an interface for accessing the first buffer from the plurality of buffers, wherein the buffer manager manages information associated with the first buffer by updating the first entry associated with the first buffer.

17. The device of claim 1, wherein the buffer manager and users operating in the user mode or kernel mode transfer control for a buffer by transferring the buffer offset from one user to another.

18. The method of claim 12, wherein the buffer manager and users operating in the user mode or kernel mode transfer control for a buffer by transferring the buffer offset from one user to another.

19. The device of claim 1, wherein the one or more processors are further configured to allocate a buffer from the plurality of buffers, wherein the one or more processors for allocating the buffer from the plurality of buffers are further configured to
determine if a buffer size requested is valid,
select a buffer with a valid size from the plurality of buffers,
check whether the plurality of buffers is running out of space, and
based on whether valid pointers are retrieved, determine whether the plurality of buffers are out of space or running out of space.

20. The method of claim 12, further comprising:
allocating a buffer from the plurality of buffers, wherein allocating a buffer from the plurality of buffers includes determining if a buffer size requested is valid;
selecting a buffer with a valid size from the plurality of buffers;
checking whether the plurality of buffers is running out of space; and
based on whether valid pointers are retrieved, determining whether the plurality of buffers are out of space or running out of space.

* * * * *